(12) United States Patent
Hahn et al.

(10) Patent No.: US 11,172,605 B2
(45) Date of Patent: Nov. 16, 2021

(54) AUTONOMOUS LAWN MOWER AND A SYSTEM FOR NAVIGATING THEREOF

(71) Applicant: TTI (MACAO COMMERCIAL OFFSHORE) LIMITED, Macau (MO)

(72) Inventors: Klaus Hahn, Kwai Chung (HK); Todd Brandon Rickey, Kwai Chung (HK); Benjamin Edgar Montgomery, Kwai Chung (HK); Nikolai Ensslen, Kwai Chung (HK); Levent Yildirim, Kwai Chung (HK)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 16/312,215

(22) PCT Filed: Apr. 26, 2017

(86) PCT No.: PCT/CN2017/082005
§ 371 (c)(1),
(2) Date: Dec. 20, 2018

(87) PCT Pub. No.: WO2018/000922
PCT Pub. Date: Jan. 4, 2018

(65) Prior Publication Data
US 2019/0327886 A1 Oct. 31, 2019

(30) Foreign Application Priority Data
Jun. 30, 2016 (HK) .................. 16107657.1

(51) Int. Cl.
*A01D 34/00* (2006.01)
*G05D 1/02* (2020.01)
(Continued)

(52) U.S. Cl.
CPC ........... *A01D 34/008* (2013.01); *A01D 34/54* (2013.01); *A01D 34/69* (2013.01); *A01D 34/84* (2013.01);
(Continued)

(58) Field of Classification Search
CPC ...... A01D 34/00; A01D 34/008; A01D 34/78; A01D 34/84; A01D 34/863;
(Continued)

(56) References Cited

U.S. PATENT DOCUMENTS

| 4,649,678 A | 3/1987 | Lamson |
| 4,887,415 A | 12/1989 | Martin et al. |

(Continued)

FOREIGN PATENT DOCUMENTS

| CN | 101100058 A | 1/2008 |
| CN | 201260303 Y | 6/2009 |

(Continued)

OTHER PUBLICATIONS

Australian Patent Office Examination Report for Application No. 2019200405 dated Feb. 13, 2020 (7 pages).
(Continued)

*Primary Examiner* — Ryan A Reis
(74) *Attorney, Agent, or Firm* — Michael Best & Friedrich LLP

(57) ABSTRACT

An autonomous lawn mower (100) and a system for navigating the same are disclosed. The autonomous lawn mower (100) comprises a mower body (102) having at least one motor (210) arranged to drive a cutting blade (212b) and to propel the mower body (102) on an operating surface via a wheel arrangement. The mower body (102) includes a navigation system (204) arranged to assist a controller (202) to control the operation of the mower body (102) within the predefined operating area (208). The system comprises a
(Continued)

plurality of navigation modules (202), each arranged to obtain individual navigation information associated with the navigation of the autonomous mower (100). The navigation modules (202) operate to generate a virtual representation of the operation area (208) of the lawn mower (100) during an initialization mode, and the virtual representation of the operation area (208) is processed with the obtained navigation information during the operation of the lawn mower (100).

28 Claims, 20 Drawing Sheets

(51) Int. Cl.
| | |
|---|---|
| B60L 50/60 | (2019.01) |
| B60L 53/62 | (2019.01) |
| A01D 34/84 | (2006.01) |
| A01D 34/54 | (2006.01) |
| A01D 34/69 | (2006.01) |
| A01D 34/74 | (2006.01) |
| A01D 34/78 | (2006.01) |
| A01D 101/00 | (2006.01) |

(52) U.S. Cl.
CPC ............... B60L 50/66 (2019.02); B60L 53/62 (2019.02); G05D 1/027 (2013.01); G05D 1/0219 (2013.01); G05D 1/0225 (2013.01); G05D 1/0231 (2013.01); G05D 1/0272 (2013.01); *A01D 34/74* (2013.01); *A01D 34/78* (2013.01); *A01D 2101/00* (2013.01); *G05D 1/0242* (2013.01); *G05D 1/0246* (2013.01); *G05D 1/0255* (2013.01); *G05D 1/0257* (2013.01); *G05D 1/0278* (2013.01); *G05D 2201/0208* (2013.01)

(58) Field of Classification Search
CPC .. A01D 2101/00; G05D 1/0214; G05D 1/027; G05D 1/0272; G05D 1/0219; G05D 1/0225; G05D 1/0231; G05D 1/0255; G05D 1/0257; G05D 1/0278; G05D 2201/0208; B60L 50/66; B60L 53/62
See application file for complete search history.

(56) References Cited

U.S. PATENT DOCUMENTS

| | | | |
|---|---|---|---|
| 5,507,137 A | 4/1996 | Norris | |
| 5,572,856 A | 11/1996 | Ku | |
| 6,009,358 A | 12/1999 | Angott et al. | |
| 6,101,795 A | 8/2000 | Diekhans | |
| 6,300,737 B1 | 10/2001 | Bergvall et al. | |
| 6,321,515 B1 | 11/2001 | Colens | |
| 6,586,908 B2 | 7/2003 | Petersson et al. | |
| 6,650,975 B2 | 11/2003 | Ruffner | |
| 6,813,557 B2 | 11/2004 | Schmidt et al. | |
| 7,053,580 B2 | 5/2006 | Aldred | |
| 7,076,348 B2 | 7/2006 | Bucher et al. | |
| 7,155,309 B2 | 12/2006 | Peless et al. | |
| 7,166,983 B2 | 1/2007 | Jung | |
| 7,185,478 B1 | 3/2007 | Willis | |
| 7,286,902 B2 | 10/2007 | Kim et al. | |
| 7,349,759 B2 | 3/2008 | Peless et al. | |
| 7,444,214 B2 | 10/2008 | Cho et al. | |
| 7,480,958 B2 | 1/2009 | Song et al. | |
| 7,574,282 B2 | 8/2009 | Petersson et al. | |
| 7,787,989 B2 | 8/2010 | Colens | |
| 7,873,437 B2 | 1/2011 | Aldred et al. | |
| 8,046,103 B2 | 10/2011 | Abramson et al. | |
| 8,106,626 B2 | 1/2012 | Li et al. | |
| 8,135,498 B2 | 3/2012 | Hyung et al. | |
| 8,275,506 B1 | 9/2012 | Bishel | |
| 8,306,659 B2 | 11/2012 | Abramson et al. | |
| 8,352,113 B2 | 1/2013 | Johnson et al. | |
| 8,373,110 B2 | 2/2013 | Fang et al. | |
| 8,392,044 B2 | 3/2013 | Thompson et al. | |
| 8,433,468 B2 | 4/2013 | Johnson et al. | |
| 8,527,197 B2 | 9/2013 | Poncelet Born Morey | |
| 8,549,826 B2 | 10/2013 | Kraft et al. | |
| 8,599,645 B2 | 12/2013 | Chiappetta et al. | |
| 8,634,960 B2 | 1/2014 | Sandin et al. | |
| 8,666,550 B2 * | 3/2014 | Anderson | A01D 34/008 700/253 |
| 8,712,623 B2 | 4/2014 | Sato et al. | |
| 8,744,663 B2 | 6/2014 | Sato et al. | |
| 8,781,627 B2 | 7/2014 | Sandin et al. | |
| 8,838,291 B2 | 9/2014 | Jagenstedt et al. | |
| 8,918,241 B2 | 12/2014 | Chen et al. | |
| 8,938,318 B2 | 1/2015 | Bergstrom et al. | |
| 8,942,862 B2 | 1/2015 | Markusson et al. | |
| 8,958,939 B2 | 2/2015 | Einecke et al. | |
| 8,972,092 B2 | 3/2015 | Yamamura et al. | |
| 8,983,693 B2 | 3/2015 | Yamamura et al. | |
| 8,996,171 B2 | 3/2015 | Anderson et al. | |
| 9,026,299 B2 | 5/2015 | Johnson et al. | |
| 9,063,547 B2 | 6/2015 | Yamamura et al. | |
| 9,072,218 B2 | 7/2015 | Johnson et al. | |
| 9,072,219 B2 | 7/2015 | Da Rocha et al. | |
| 9,104,206 B2 | 8/2015 | Biber et al. | |
| 9,110,471 B2 | 8/2015 | Pack et al. | |
| 9,119,341 B2 | 9/2015 | Jagenstedt | |
| 9,137,943 B2 | 9/2015 | Einecke et al. | |
| 9,173,343 B2 | 11/2015 | Bernini | |
| 9,182,763 B2 | 11/2015 | Park et al. | |
| 9,204,594 B2 | 12/2015 | Hwang et al. | |
| 9,223,312 B2 | 12/2015 | Goel et al. | |
| 9,232,692 B2 | 1/2016 | Bjorn et al. | |
| 9,268,331 B2 | 2/2016 | Abramson et al. | |
| 9,278,690 B2 | 3/2016 | Smith | |
| 9,335,767 B2 | 5/2016 | Jang et al. | |
| 9,363,945 B2 | 6/2016 | Jagenstedt et al. | |
| 9,405,294 B2 | 8/2016 | Jagenstedt et al. | |
| 9,425,654 B2 | 8/2016 | Lenius et al. | |
| 9,427,875 B2 | 8/2016 | Gael et al. | |
| 9,429,950 B2 | 8/2016 | Sjoholm | |
| 9,471,063 B2 | 10/2016 | Ouyang | |
| 9,483,053 B2 | 11/2016 | Yamamura et al. | |
| 9,497,901 B2 | 11/2016 | Willgert | |
| 9,516,806 B2 | 12/2016 | Yamauchi et al. | |
| 9,573,275 B2 | 2/2017 | Reigo et al. | |
| 9,612,597 B2 | 4/2017 | Nakayama et al. | |
| 9,622,399 B2 | 4/2017 | Kremmer et al. | |
| 9,720,417 B2 | 8/2017 | Reigo et al. | |
| 9,740,210 B2 | 8/2017 | Sjoholm | |
| 9,766,627 B2 | 9/2017 | Jagenstedt et al. | |
| 9,804,604 B2 | 10/2017 | Mattsson et al. | |
| 9,872,437 B2 | 1/2018 | Markusson et al. | |
| 9,876,370 B2 | 1/2018 | Yamamura et al. | |
| 1,003,152 A1 | 7/2018 | Bjorn | |
| 1,007,833 A1 | 9/2018 | Reigo et al. | |
| 1,010,819 A1 | 10/2018 | Bjorn et al. | |
| 1,013,657 A1 | 11/2018 | Reigo | |
| 1,014,943 A1 | 12/2018 | Bergstrom et al. | |
| 1,018,532 A1 | 1/2019 | Reigo et al. | |
| 10,225,984 B2 | 3/2019 | Slichter et al. | |
| 10,408,946 B2 | 9/2019 | Pyke et al. | |
| 2002/0156556 A1 | 10/2002 | Ruffner | |
| 2003/0144774 A1 | 7/2003 | Trissel et al. | |
| 2003/0236590 A1 | 12/2003 | Park et al. | |
| 2004/0190376 A1 | 9/2004 | Hulden et al. | |
| 2005/0171644 A1 | 8/2005 | Tani | |
| 2006/0150361 A1 | 7/2006 | Aldred et al. | |
| 2006/0212191 A1 | 9/2006 | Saeki | |
| 2006/0217854 A1 | 9/2006 | Takenaka et al. | |
| 2006/0229765 A1 | 10/2006 | Bommer et al. | |
| 2007/0100496 A1 | 5/2007 | Forell | |
| 2007/0222286 A1 | 9/2007 | Miura | |
| 2007/0276541 A1 | 11/2007 | Sawasaki | |
| 2007/0294991 A1 | 12/2007 | Medina et al. | |

(56) References Cited

U.S. PATENT DOCUMENTS

| | | | |
|---|---|---|---|
| 2008/0039974 A1* | 2/2008 | Sandin | G05D 1/0261 700/258 |
| 2008/0184687 A1 | 8/2008 | Scherbring et al. | |
| 2008/0276407 A1 | 11/2008 | Schnittman et al. | |
| 2009/0201650 A1 | 8/2009 | Hauser et al. | |
| 2010/0053593 A1 | 3/2010 | Bedros et al. | |
| 2010/0057286 A1 | 3/2010 | Kerchner | |
| 2011/0040427 A1 | 2/2011 | Ben-Tzvi | |
| 2012/0029752 A1 | 2/2012 | Johnson et al. | |
| 2012/0215380 A1 | 8/2012 | Fouillade et al. | |
| 2013/0047565 A1 | 2/2013 | Shida et al. | |
| 2013/0073166 A1 | 3/2013 | Sollart | |
| 2013/0211646 A1 | 8/2013 | Yamamura et al. | |
| 2013/0345968 A1 | 12/2013 | Hartman | |
| 2014/0163733 A1 | 6/2014 | Sadowski et al. | |
| 2014/0324269 A1* | 10/2014 | Abramson | G05D 1/0265 701/26 |
| 2014/0330496 A1 | 11/2014 | Crouse et al. | |
| 2015/0012164 A1 | 1/2015 | Yu et al. | |
| 2015/0039269 A1 | 2/2015 | Mejegard et al. | |
| 2015/0042280 A1 | 2/2015 | Rief et al. | |
| 2015/0045992 A1 | 2/2015 | Ashby et al. | |
| 2015/0128547 A1 | 5/2015 | Einecke et al. | |
| 2015/0163993 A1 | 6/2015 | Pettersson | |
| 2015/0220086 A1 | 8/2015 | Willgert | |
| 2015/0271991 A1 | 10/2015 | Balutis | |
| 2015/0328775 A1 | 11/2015 | Shamlian et al. | |
| 2015/0366137 A1 | 12/2015 | Markusson et al. | |
| 2015/0379785 A1 | 12/2015 | Brown et al. | |
| 2016/0051108 A1 | 2/2016 | Huang et al. | |
| 2016/0091898 A1 | 3/2016 | Booher | |
| 2016/0100521 A1 | 4/2016 | Halloran et al. | |
| 2016/0129593 A1* | 5/2016 | Wolowelsky | B25J 9/163 700/253 |
| 2016/0129917 A1 | 5/2016 | Gariepy et al. | |
| 2016/0157275 A1 | 6/2016 | Matthews | |
| 2016/0157422 A1 | 6/2016 | Kohler et al. | |
| 2016/0179095 A1 | 6/2016 | Sarid et al. | |
| 2016/0278285 A1* | 9/2016 | Reigo | B60L 1/003 |
| 2016/0282868 A1 | 9/2016 | Yamamura et al. | |
| 2016/0311076 A1 | 10/2016 | Shigeru et al. | |
| 2016/0338262 A1 | 11/2016 | Liu et al. | |
| 2016/0377688 A1 | 12/2016 | Kleiner et al. | |
| 2017/0042085 A1 | 2/2017 | Bjorn et al. | |
| 2017/0108872 A1 | 4/2017 | Mannefred et al. | |
| 2017/0127607 A1 | 5/2017 | Mannefred et al. | |
| 2017/0129297 A1 | 5/2017 | Bjorn et al. | |
| 2017/0139419 A1 | 5/2017 | Jagenstedt et al. | |
| 2017/0181591 A1 | 6/2017 | Tanaka et al. | |
| 2017/0251060 A1 | 8/2017 | Larsen et al. | |
| 2017/0282735 A1 | 10/2017 | Yamamura et al. | |
| 2017/0285630 A1 | 10/2017 | Yamamura | |
| 2017/0285652 A1 | 10/2017 | Shimamura et al. | |
| 2017/0285653 A1 | 10/2017 | Yamamura | |
| 2017/0303466 A1 | 10/2017 | Grufman et al. | |
| 2017/0308092 A1 | 10/2017 | Altinger et al. | |
| 2017/0315554 A1 | 11/2017 | Lee et al. | |
| 2017/0320215 A1 | 11/2017 | Strandberg et al. | |
| 2017/0325400 A1 | 11/2017 | Kupervasser et al. | |
| 2017/0344012 A1 | 11/2017 | Kamfors et al. | |
| 2017/0344020 A1 | 11/2017 | Mannefred et al. | |
| 2017/0344024 A1 | 11/2017 | Grufman et al. | |
| 2017/0345210 A1 | 11/2017 | Grufman et al. | |
| 2017/0347521 A1 | 12/2017 | Tjernberg et al. | |
| 2017/0351260 A1 | 12/2017 | Willgert et al. | |
| 2017/0357006 A1 | 12/2017 | Ohrlund et al. | |
| 2017/0364088 A1 | 12/2017 | Grufman et al. | |
| 2017/0364090 A1* | 12/2017 | Grufman | G05D 1/0214 |
| 2017/0372514 A1 | 12/2017 | Grufman et al. | |
| 2018/0038993 A1 | 2/2018 | Jagenstedt et al. | |
| 2018/0064023 A1 | 3/2018 | Song et al. | |
| 2018/0081366 A1 | 3/2018 | Tan et al. | |
| 2018/0139896 A1 | 5/2018 | Wahlgren | |
| 2018/0255704 A1 | 9/2018 | Kamfors et al. | |
| 2018/0263181 A1 | 9/2018 | Willgert et al. | |
| 2018/0263182 A1 | 9/2018 | Albinger et al. | |

FOREIGN PATENT DOCUMENTS

| | | |
|---|---|---|
| CN | 201557392 U | 8/2010 |
| CN | 202077380 U | 12/2011 |
| CN | 102662400 | 9/2012 |
| CN | 102687620 A | 9/2012 |
| CN | 102771246 A | 11/2012 |
| CN | 202958189 U | 6/2013 |
| CN | 103283404 A | 9/2013 |
| CN | 103631262 B | 3/2014 |
| CN | 203575087 U | 5/2014 |
| CN | 203691948 U | 7/2014 |
| CN | 104007765 B | 8/2014 |
| CN | 203840762 U | 9/2014 |
| CN | 104360684 B | 2/2015 |
| CN | 104521417 | 4/2015 |
| CN | 104704980 A | 6/2015 |
| CN | 104714547 A | 6/2015 |
| CN | 104793617 A | 7/2015 |
| CN | 204462853 U | 7/2015 |
| CN | 204495362 U | 7/2015 |
| CN | 204649212 U | 9/2015 |
| CN | 105230225 A | 1/2016 |
| CN | 105353758 A | 2/2016 |
| CN | 205179745 U | 4/2016 |
| CN | 205196323 U | 5/2016 |
| CN | 105684630 A | 6/2016 |
| CN | 106020207 A | 10/2016 |
| CN | 106155056 A | 11/2016 |
| CN | 106168484 A | 11/2016 |
| CN | 106325280 A | 1/2017 |
| CN | 106489412 A | 3/2017 |
| CN | 206115269 U | 4/2017 |
| CN | 106647727 A | 5/2017 |
| CN | 107305391 A | 10/2017 |
| CN | 107399377 A | 11/2017 |
| CN | 107608341 A | 1/2018 |
| CN | 107846841 A | 3/2018 |
| DE | 10302908 A1 | 8/2004 |
| DE | 102005015615 B4 | 10/2006 |
| DE | 102007053310 A1 | 6/2009 |
| DE | 102007059118 | 6/2009 |
| DE | 102008011947 A1 | 9/2009 |
| DE | 102014112587 A1 | 3/2015 |
| EP | 1228681 A1 | 8/2002 |
| EP | 1704766 | 9/2006 |
| EP | 2583609 A2 | 4/2013 |
| EP | 2620050 | 7/2013 |
| EP | 2687077 B1 | 1/2014 |
| EP | 2743789 A1 | 6/2014 |
| EP | 2806325 A2 | 11/2014 |
| EP | 2851760 A1 | 3/2015 |
| EP | 2870853 | 5/2015 |
| EP | 2883437 A1 | 6/2015 |
| EP | 2939513 A1 | 11/2015 |
| EP | 2959764 | 12/2015 |
| GB | 2147665 A | 5/1985 |
| WO | 2003103375 A1 | 12/2003 |
| WO | 2007051972 A1 | 5/2007 |
| WO | 2007091967 A1 | 8/2007 |
| WO | 2007109624 A2 | 9/2007 |
| WO | 2009106435 | 9/2009 |
| WO | 2010077198 A1 | 7/2010 |
| WO | 2011115536 A1 | 9/2011 |
| WO | 2013064301 A1 | 5/2013 |
| WO | WO 2013081516 A1 | 6/2013 |
| WO | 2013125992 A1 | 8/2013 |
| WO | WO 2016097891 A1 | 6/2016 |
| WO | WO 2016097892 A1 | 6/2016 |
| WO | WO 2016097897 A1 | 6/2016 |
| WO | WO 2016103070 A1 | 6/2016 |
| WO | 2016109721 A1 | 7/2016 |
| WO | WO 2016108104 A1 | 7/2016 |
| WO | WO 2017092798 A1 | 6/2017 |
| WO | WO 2017092801 A1 | 6/2017 |

(56) References Cited

FOREIGN PATENT DOCUMENTS

| WO | WO 2017123136 A1 | 7/2017 |
|----|------------------|--------|
| WO | WO 2017123137 A1 | 7/2017 |
| WO | WO 2018013045 A1 | 1/2018 |
| WO | 2018041146 A1 | 3/2018 |
| WO | 2018060966 A1 | 4/2018 |
| WO | WO 2018132048 A1 | 7/2018 |
| WO | WO 2018135988 A1 | 7/2018 |
| WO | WO 2018160114 A1 | 9/2018 |

OTHER PUBLICATIONS

International Search Report and Written Opinion for International Application No. PCT/CN2017/091129 dated Oct. 12, 2017.
International Search Report and Written Opinion for International Application No. PCT/CN2017/082005 dated Aug. 9, 2017.
Extended European Search Report for European Application No. 19151703.6 dated Aug. 7, 2019 (8 pages).
Cong et al., "Multisensor fusion and navigation for robot mower," 2007 IEEE International Conference on Robotics and Biomimetics, 2007, pp. 417-422.
Chinese Patent Office Action for Application No. 201910062030.8 dated Feb. 1, 2021 (9 pages including statement of relevance).
Extended European Search Report for Application No. 17818919.7 dated Aug. 13, 2020 (7 pages).
Extended European Search Report for Application No. 17819355.3 dated Aug. 13, 2020 (15 pages).
Australian Patent Office Examination Report No. 2 for Application No. 2019200405 dated Feb. 9, 2021 (6 pages).
Australian Patent Office Examination Report No. 2 for Application No. 2019200408 dated Feb. 9, 2021 (8 pages).
Australian Patent Office Examination Report No. 1 for Application No. 2019200409 dated Feb. 19, 2020 (8 pages).
Australian Patent Office Examination Report No. 2 for Application No. 2019200409 dated Feb. 12, 2021 (9 pages).
Chinese Patent Office Action for Application No. 201780040184.6 dated Jun. 25, 2021 (11 pages including statement of relevance).
Chinese Patent Office Action for Application No. 201780040111.7, dated Aug. 10, 2021 (10 pages including statement of relevance).
Chinese Patent Office Action for Application No. 201910062030.8 dated Aug. 31, 2021 (8 pages including statement of relevance).

\* cited by examiner

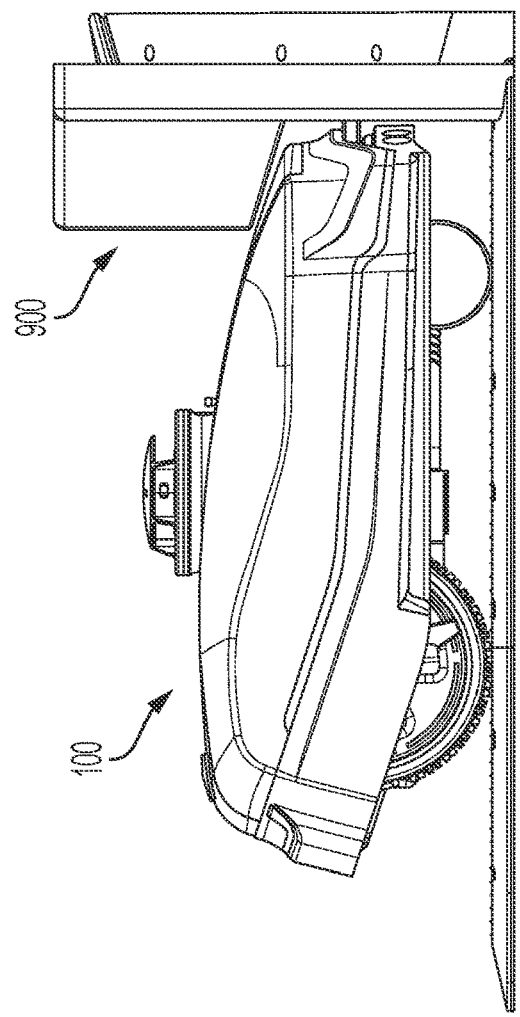
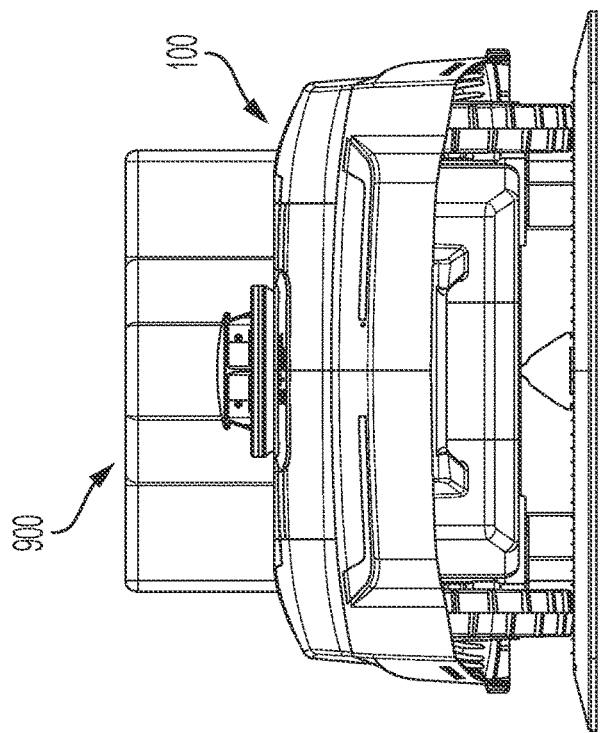
FIG. 18

AUTONOMOUS LAWN MOWER AND A SYSTEM FOR NAVIGATING THEREOF

TECHNICAL FIELD

The present invention relates to an autonomous lawn mower and a system for navigating thereof, and particularly, although not exclusively, to an autonomous lawn mower which uses a navigating system to control the navigation of the autonomous lawn mower during its operation.

BACKGROUND

The maintenance of lawns requires a significant amount of manual labour including constant watering, fertilizing and mowing of the lawn to maintain a strong grass coverage. Although watering and fertilizing can sometimes be handled with minimal effort by use of a sprinkler or irrigation system, the mowing process is one process that demands a significant amount of physical effort from gardeners.

Designers and manufacturers of lawn mowers have attempted to manufacture autonomous lawn mowers for some time to replace the traditional push pull mowers. However, the unpredictability of a landscape together with the cost of creating an accurate and usable product has meant many autonomous lawn mowers simply do not perform at an adequate level of performance.

This is in part due to the fact that gardens come in many different varieties and shapes, with different elevations and profiles. Thus the autonomous mowers have had significant trouble in navigating these different types of terrain. In turn, many push mowers are still preferred by users as their performance and control can still be manually controlled to overcome problems associated with different landscape profiles.

SUMMARY OF THE INVENTION

In accordance with a first aspect of the present invention, there is provided an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area.

In an embodiment of the first aspect, the navigation system includes a plurality of navigation modules, each arranged to obtain navigation information associated with the navigation of the lawn mower.

In an embodiment of the first aspect, the navigation information is further processed by the controller to control the operation of the lawn mower.

In an embodiment of the first aspect, the navigation information includes a distance and direction travelled by the wheel arrangement of the mower, a surveyed representation of the predefined operating area, a location of obstacles proximate to the lawn mower, directions and accelerations of the lawn mower or any combination of one or more thereof.

In one example embodiment, the direction of the mower can be obtained by a magnetometer arranged to provide a bearing of the mower, whilst the orientation of the mower, in 3 axes, may be obtained by a gyroscope arrangement. The gyroscope and magnetometer may be integrally implemented within an Inertial measurement unit (IMU) with an accelerometer or a barometer.

In an embodiment of the first aspect, the navigation system includes an odometry module arranged to track the movement of the mower body on the operating surface.

In an embodiment of the first aspect, the odometry module is arranged to track the movement of the mower body on the operating surface by determining the rotation distance of at least one wheel of the wheel arrangement.

In an embodiment of the first aspect, the odometry module includes one or more sensors arranged to detect a rate of rotation of the each of at least one wheel of the wheel arrangement.

In an embodiment of the first aspect, the rate of rotation of each of the wheels is applied to a transmission ratio to determine the rotation distance of the wheel.

In an embodiment of the first aspect, the rate of rotation of the motor is applied to a transmission ratio determine the rotation distance of the wheel.

In an embodiment of the first aspect, the one or more sensors are disposed onto each driving motor arranged to drive a pair of opposing wheels of the wheel arrangement.

In an embodiment of the first aspect, the odometry module is arranged to communicate with the one or more sensors disposed onto each driving motor to determine the distance and direction travelled of each of the pair of opposing wheels.

In an embodiment of the first aspect, the odometry module is arranged to transmit the rotation distance and the direction of rotation of each of the pair of opposing wheels to the navigation system.

In an embodiment of the first aspect, the navigation system includes an optical surveying module arranged to scan and survey the proximate area around the mower to devise the surveyed representation of the predefined operating area.

In an embodiment, the term optical surveying module may include any surveying modules that are capable of assisting the mower to "see" its surroundings. In these since, the term "optical" may include surveying modules that uses light based technologies, including lasers or cameras which object recognition processing. However, it is understood that the optical surveying module may also assist the mower to "see" its surroundings by use of non-light based technologies, such as by radio waves (radar) or sound waves. Thus the term "optical" in this sense may reference light based technologies or "optical" in the sense that it assists the mower to "see" without necessarily using light based technologies.

In an embodiment of the first aspect, the optical surveying module is further arranged to use an optical means to scan and survey the proximate area around the mower.

In an embodiment of the first aspect, the optical surveying module is placed at an elevated position on the mower body.

In an embodiment of the first aspect, the optical surveying module is a LIDAR unit.

In one embodiment, there may be more than one LIDAR unit.

In an embodiment of the first aspect, the navigation system further includes a sonic or supersonic obstacle detection module arranged to use sound waves to detect any obstacles proximate to the mower.

In one embodiment, may be a plurality of sonic or supersonic obstacle detection modules.

In an embodiment of the first aspect, the sonic obstacle detection module is a sonar unit.

In an embodiment, the sonic obstacle detection module is a laser sensor.

In an embodiment, the sonic obstacle detection module is an Infrared (IR) unit.

In an embodiment, the sonic obstacle detection module is a radio wave (RADAR) unit.

In an embodiment of the first aspect, the navigation system further includes an inertial measurement unit (IMU) arranged to measure and record any physical forces subjected on the lawn mower.

In an embodiment of the first aspect, the inertial measurement unit is removable from the lawn mower for physical manipulation by the user.

In an embodiment of the first aspect, the navigation system may also include a satellite navigation system, such as a GPS system arranged to identify the position of the mower, the direction of travel and the ground speed of the mower.

In an embodiment of the first aspect, the navigation system further includes additional sensors arranged to provide navigation information, including GPS coordinates, "cliff" infrared sensors, water/rain sensors, edge sensors, light sensors or any one or more combination thereof. Communication ports such as ports which may be arranged to communicate with WiFi, Bluetooth, Mobile telephony protocols, radio frequency, DECT, RFID or any other communication protocols may also be used to exchange navigation information or to assist in the navigation process either individually or in combination with any sensor.

In accordance with a second embodiment of the present invention, there is provided a system for navigating an autonomous lawn mower comprising: a plurality of navigation modules, each arranged to obtain individual navigation information associated with the navigation of the autonomous mower; wherein, the plurality of navigation modules operate during an initialisation mode to generate a virtual representation of an operation area of the lawn mower; and during an operation of the lawn mower, the virtual representation of the operation area is processed with navigation information obtained by the plurality of navigation modules when the lawn mower is operating.

In an embodiment of the second aspect, the virtual representation of the operation area is compared with navigation information obtained by the plurality of navigation modules when the lawn mower is operating to locate and navigate the lawn mower during operation.

In an embodiment of the second aspect, the plurality of navigation modules include an odometry module arranged to track the movement of the mower body on the operating surface by determining the rotation distance of at least one wheel of the wheel arrangement.

In an embodiment of the second aspect, the plurality of navigation modules include an optical surveying module arranged to scan and survey the proximate area around the mower to devise the surveyed representation of the predefined operating area.

In an embodiment of the second aspect, the plurality of navigation modules includes a sonic obstacle detection module arranged to use sound waves to detect any obstacles proximate to the mower.

In an embodiment of the second aspect, the plurality of navigation modules includes an inertial measurement unit arranged to measure and record any physical forces subjected on the lawn mower.

In an embodiment of the second aspect, the plurality of navigation modules includes a satellite navigation module arranged to operate with a satellite navigation system to locate the lawn mower and to establish a direction of travel and speed of the lawn mower.

In an embodiment of the second aspect, the plurality of navigation modules includes an Infrared (IR) module arranged to interact with another optical or IR system to communicate navigation information with the mower.

This example embodiment is particularly advantageous where the lawn mower must perform maneuvers in tight spaces, such as when it is necessary to maneuver the lawn mower into its docking station, where an IR system implemented on or adjacent to the docketing station and the mower can assist in navigating the mower into the docketing station as the IR can communicate the location of the mower relative to portions of the docketing station.

In an embodiment of the second aspect, the initialisation mode is performed by a user to define one or more operation area of the lawn mower.

In an embodiment of the second aspect, the user defines an operation area of the lawn mower by controlling the mower around the perimeter of the one or more operation area.

In an embodiment, the user may also define an exclusion area of the lawn mower by controlling the mower around the perimeter of one or more non-operation areas.

In an embodiment, the user may also define a movement area of the lawn mower by controlling the mower within the boundary area between the operation area and the exclusion area, with the blade mechanism deactivated.

In accordance with a third embodiment of the present invention, there is provided an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area; and a battery module arranged to provide power supply to the motor; wherein the battery module is placed at a lower position within the rear mower body.

In an embodiment of the third aspect, the battery module is arranged at a tilted angle with respect to the operating surface to facilitate the access to the battery module.

In an embodiment of the third aspect, the mower body is further provided a battery cover arranged to cover the access to the battery module.

In accordance with a fourth embodiment of the present invention, there is provided an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area; wherein the mower body further includes a height adjustment system arranged to assist the controller to control the operation of the cutting blade within a predefined operating height.

In an embodiment of the fourth aspect, the height adjustment system includes one or more sensors arranged to determine the height of the cutting blade.

In an embodiment of the fourth aspect, the height adjustment system is arranged to communicate with the one or more sensors to determine the number of rotations required by the cutting blade to reach the predefined operating height.

In accordance with a fifth embodiment of the present invention, there is provided an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area; wherein the cutting blade is pivotally connected to and driven by a motor-driven disc.

In an embodiment of the fifth aspect, the cutting blade is arranged to swing in a first direction by the motor-driven disc and swing in a second direction if the cutting blade contacts any obstacles.

In an embodiment of the fifth aspect, the first direction corresponds to the rotating direction of the motor and the second direction is opposite to the first direction.

In accordance with a sixth embodiment of the present invention, there is provided an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area; wherein the mower body further includes a cutter module arranged to trim the edges of the predefined operating area.

In an embodiment of the sixth aspect, the cutter module is placed at a position underneath the mower body and adjacent to the operating circumference of the cutting blade.

In an embodiment of the sixth aspect, the cutter module is removably engaged with the a mower body through a locking mechanism.

In accordance with a seventh embodiment of the present invention, there is provided an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area; wherein at least part of the cutting blade is surrounded by a blade guard.

In an embodiment of the seventh aspect, at least a partial edge of the blade guard is further provided a toothed comb.

In an embodiment of the seventh aspect, the partial edge provided with the toothed comb is substantially perpendicular to the operating direction of the lawn mower.

In accordance with a eighth embodiment of the present invention, there is provided an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area; a battery module arranged to provide power supply to the motor; and a detachable docking module arranged to provide battery charging to the battery module.

In an embodiment of the eighth aspect, the navigation system is further arranged to locate the mower with reference to the detachable docking module.

In an embodiment of the eighth aspect, the navigation system directs the mower towards the detachable docking module.

In an embodiment of the eighth aspect, the navigation system includes an imaging module for obtaining the information associated with the position of the detachable docking module.

In an embodiment of the eighth aspect, the detachable docking module is arranged to provide the imaging module an indication associated with the position of the detachable docking module.

In an embodiment of the eighth aspect, the indication is represented in a graphical representation.

In an embodiment of the eighth aspect, the navigation system includes an optical surveying module for obtaining the information associated with the position of the detachable docking module.

In an embodiment of the eighth aspect, the optical surveying module is arranged to scan and survey the proximate area around the mower to devise the surveyed representation of the predefined operation area, thereby locating the position of the detachable docking module.

In an embodiment of the eighth aspect, the navigation system includes an induction wire system for obtaining the information associated with the position of the detachable docking module.

In an embodiment of the eighth aspect, the induction wire system includes at least one sensor arranged to communicate with a coil of the detachable docking module in an electromagnetic communication.

BRIEF DESCRIPTION OF THE DRAWINGS

Embodiments of the present invention will now be described, by way of example, with reference to the accompanying drawings in which:

FIG. 18 is a front and side view of the docking module and the autonomous lawn depicted in FIG. 17;

DETAILED DESCRIPTION OF THE PREFERRED EMBODIMENT

Figure 1:
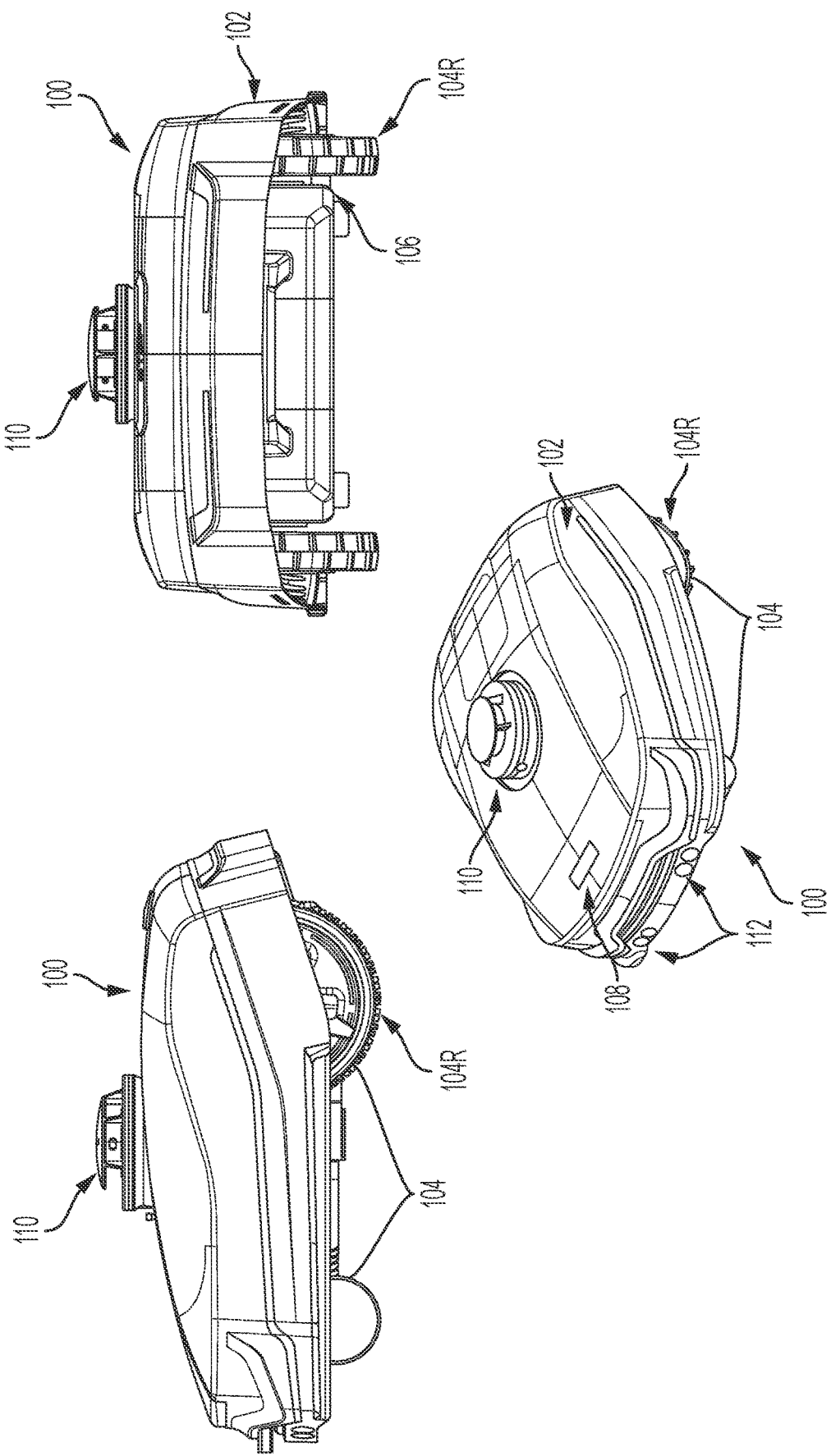
FIG. 1 is an illustration of an autonomous lawn mower in accordance with one embodiment of the present invention.

With reference to FIG. 1, there is provided an illustration of an autonomous lawn mower comprising: a mower body having at least one motor arranged to drive a cutting blade and to propel the mower body on an operating surface via a wheel arrangement, wherein the mower body includes a navigation system arranged to assist a controller to control the operation of the mower body within a predefined operating area.

In this example, the autonomous lawn mower 100 is arranged to operate on a lawn or grass grown surface so as to cut the grass. This action is commonly known as "mow the lawn" and is often undertaken by gardeners and landscape workers to maintain a lawn surface. The term autonomous lawn mower 100 may also include any type of grass cutting device or lawn mower which can operate autonomously, that is, with minimum user intervention. It is expected that user intervention at some point is required to set up or initialize the mower or to calibrate the mower with specific commands, but once these procedures have been undertaken, the mower 100 is largely adapted to operate on its own until further commands are required or if servicing, calibration or error correction is required. Accordingly, autonomous lawn mowers may also be known as automatic lawn mowers, self-driven lawn mowers, robotic lawn mowers or the like.

In this embodiment as shown in FIG. 1, the autonomous lawn mower 100, or referred to as the lawn mower or mower, includes a frame or housing 102 which supports the operating components of the mower 100. These operating components may include, without limitation at least one motor, such as an electric motor, which is arranged to drive the blades of the mower so as to cut the grass of a lawn to which the mower is mowing. The at least one motor may also be used to drive the mower itself via the means of transmission systems, such as gearing mechanisms or gearboxes which transmit a driving force to its wheel arrangements 104, although preferably, as is the case of this embodiment, separate motors are used to drive the mower along its operating surface with each rear wheel 104R having its own individual motor and gearbox. This is advantageous in that maneuvering the mower may be implemented by simple control of each of these motors. It is important to note that the term wheel arrangements may also include driving arrangements that are formed from various different types and combination of wheels, including tracks (such as in tank tracks), chains, belts (such as in snow belts) or other forms of driving arrangements.

Preferably, as shown in the embodiment of FIG. 1, the mower 100 includes a navigation system which operates to locate and navigate the mower around a working area so that the mower can cut the grass of a working area. The navigation system may include a number of specific navigation modules each arranged to provide individual navigation information obtained for the mower 100. In turn, the navigation information obtained or determined by each of these navigation modules are then returned to the navigation system for transmission to a controller. Upon processing of the navigation information by the controller, the controller may then generate commands which are used to control the movement and operation of the mower within a work or operation area.

These navigation modules may include at least the follow:

An odometry module 106 arranged to determine the distance travelled by the wheels 104 so as to assist in the determination of the location of the mower 100 from a starting point;

An inertial measurement unit (IMU) module 108 arranged to measure the force of movement of the mower by detecting and recording various forces which are subjected on the mower 100, including the direction of movement, force of movement, magnetic bearing of movement, acceleration and gyroscopic movements. In some example implementations, more than one IMUs may be used to improve accuracy, since additional IMUs will assist in eliminating errors over time An optical surveying module 110 arranged to use an optical means to scan and survey the immediate area around the mower 100. An example implementation of this optical surveying module 110 may be the placement of a LIDAR unit on the mower body 102 so as to scan a surrounding area of the mower 100 to produce a dynamic map of the immediate spatial environment proximate to the mower 100;

A barometric sensor arranged to measure the air pressure surrounding the mower. Such an arrangement may be advantageous in that the altitude of the mower can be measured based on the air pressure changes it experiences as the mower moves along its operation areas or relative to its docking station and thus assist in its localization and navigation. Preferably, the barometric sensor can also be calibrated, either automatically or manually by the use of weather information that is transmitted to the mower via its communication modules;

A sonic or ultrasonic obstacle detection module 112 arranged to use sound waves to detect if there are any obstacles proximate to the mower so as to assist the mower with avoiding these obstacles, or in some examples, to approach one or more objects, whilst avoiding direct contact or collision with the object so as to enhance the operation of the mower by navigating the mower to be proximal to certain objects for operation, whilst avoiding a collision with the objects. Example implementations of the sonic obstacle detection module may be by the use of SONAR sensors or ultrasonic sensors which can detect obstacles; and, Other additional navigation modules (not shown) may also be implemented to communicate with the navigation system so as to provide further input to the navigation system to adjust and control the mower, including:

GPS sensors which can be used to obtain a GPS coordinate of the mower 100. In some examples, the mower may be implemented to use "RTK GPS" or Real Time Kinematic GPS which includes two GPS modules, one fixed and one in the mower in addition to advanced GPS information to determine the precise position of the mower within the mowing area and world;

Compass sensors to obtain a compass bearing of the mower 100;

Rain sensors or water sensors to detect if the immediate environment is subject to rain, high levels of moisture or entry of the mower into a puddle of water and if so, adjust or terminate operation of the mower 100;

Edge sensors or cliff sensors to detect if the mower 100 has reached an edge or a cliff whereby any further movement may cause the mower 100 to experience a fall;

Light sensors to detect light or time of day and adjust operation accordingly, including the switching on of warning lights; and, Other additional sensors and function modules, such as clock, WiFi, Bluetooth, GSM, RF, DECT, or any other communication protocol modules arranged to receive COMMUNICATION PROTOCOLS external information received via communications connections such as weather reports or remote commands to enhance and control the operation of the mower 100.

These navigation modules are each arranged to obtain, detect and determine a set of navigation related information, which are in turn arranged to be processed by a processor on the controller to devise suitable commands to operate the mower 100. As it will be explained below with reference to FIGS. 8 and 9, in one example, the autonomous lawn mower will operate by moving away from a docking station (not shown) which will form a start and return point for the mower. The mower 100, when departing the docking station may then use the navigation system to assist with navigating the mower 100 around a work or operation area by cutting the lawn in the operating area, and then proceeding to navigate its way back to the docking station.

Figure 2:
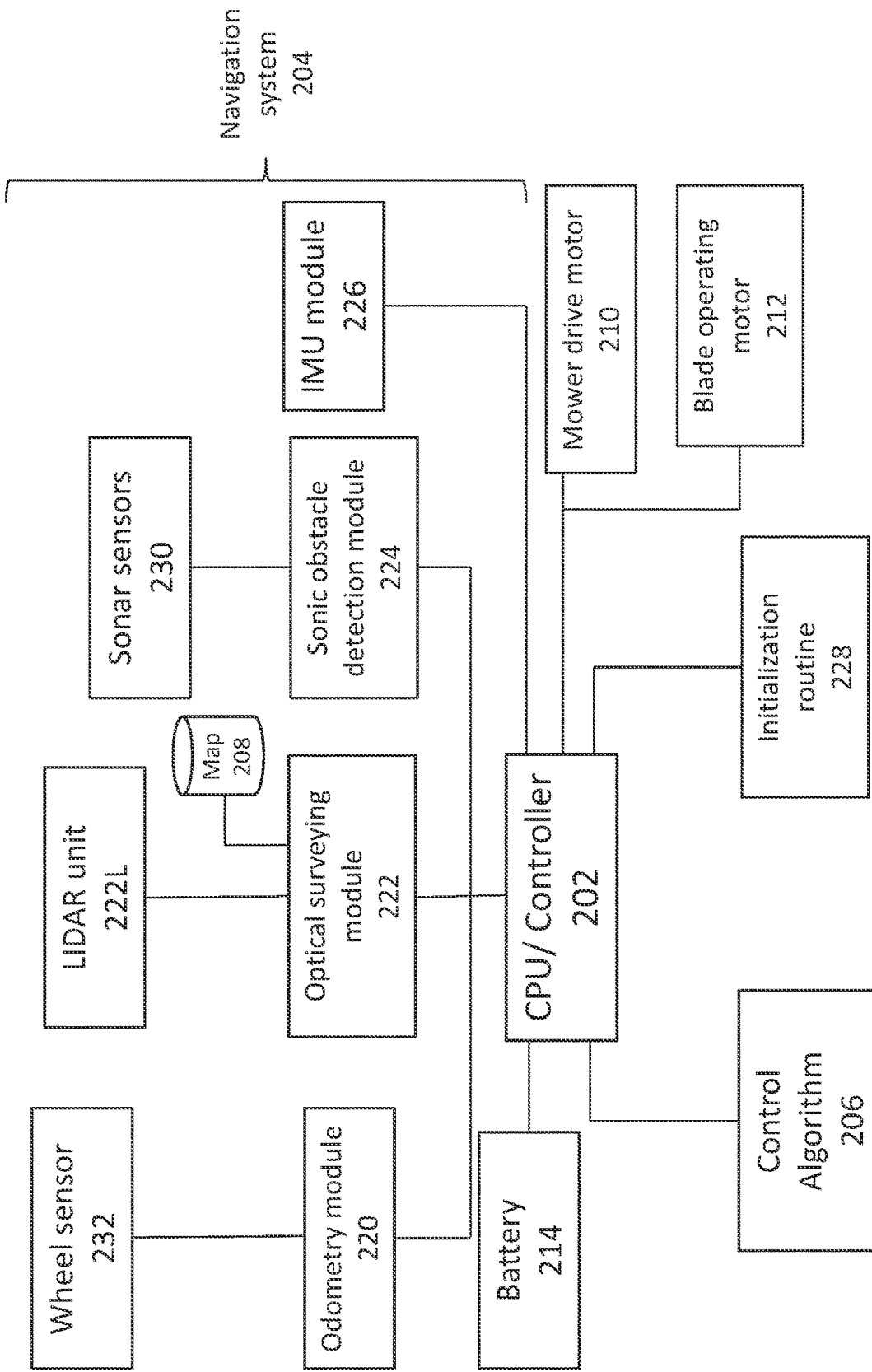
FIG. 2 is a block diagram illustrating an example of various control systems and modules of the autonomous lawn mower of FIG. 1.

With reference to FIG. 2, there is provided a block diagram of the autonomous lawn mower 100 which illustrates the components of the autonomous lawn mower 100. In this embodiment, the mower 100 includes a controller/processor 202 which may be implemented as a computing device, or as one or more control boards, with each having one or more processors arranged to receive and analyse the information received and to provide instructions to the mower in order to operate the mower. Preferably, the controller/processor 202 is implemented with a main printed circuit board assembly (PCBA) arranged to have two processors on the PCBA and to operate together with an additional computing module. Several of the sensor PCBAs may also have their own individual Microcontroller units (MCUs).

The controller/processors 202 is arranged to receive navigation information from the navigation system 204 of the mower 100 and in turn, upon the receipt of this navigation information, will process the navigation information with existing information already accessible by the controller 202 such as the control algorithm 206 or predefined map of the operating area 208 to generate various commands to each of the mower operating components, including the drive motors arranged to drive the mower 210 and/or the blade motors which operates the blades 212.

As shown in FIG. 2, the navigation system 204 includes the odometry module 220, which includes wheel sensors 232 to detect the rotational displacement of the wheels of the mower 100, the optical surveying module 222 (such as an LIDAR unit 222L), the IMU unit 226, the sonic obstacle detection module 224, which may include Sonar sensors 230 although other sound wave based obstacle detections methods are possible. Each of these modules are arranged to provide a specific function which are described below with reference to FIGS. 3 to 7 and return individual navigation information either detected, calculated, gathered or surveyed, as in the case of the LIDAR unit 222L which is arranged to generate a virtual map 208 representative of the obstacles or placement of specific objections proximate to the mower 100.

As illustrated in this embodiment, the controller 202 is also arranged to control the mower drive motors 210 to drive the mower 100 along a work surface within a work area. Preferably, as is the case in this embodiment, the mower is driven by having a motor placed adjacent to each of the rear wheels with each motor being arranged to drive each rear wheel.

In turn, the controller 202 can direct electric current from a power source, such as a battery 214, to the motors 210 so as to perform a controlled operation of one or both motors 210. This can allow for forward, reverse and turning actions of the mower 100 by turning one or more wheels at different speeds or directions.

The controller 202 can also command the blade motor 212 to operate so as to operate the blades to cut the grass of a work surface. To perform these functions, the controller 202 will execute a control routine or process 206 which determines the conditions for and when the mower is to be operated. These commands at least include instructions to command the direction of travel of the mower 100 and the operation of the blades. Other commands are also possible, including the command of the mower 100 to travel to a particular location within a work area, or to return to a specific location, such as a docking station as well as specific commands such as the operating speed of the blade motor 212 or the height of the blade so as to determine the level of grass that is cut.

As it will be explained below with reference to FIG. 8, the controller 202 may also be pre-programmed with an initialization routine 228 wherein the mower's working area and work surfaces are initially identified. These process may assist in identify the boundaries of a working area and the categorization that certain surfaces within the boundaries should be avoided (no travel zones) or should not have the blade motor activated 212. Once these working areas are identified, the mower 100 can then be controlled by the controller 202 to navigate to a starting point from the docking station, wherein the mower can proceed to cut the grass from the starting point as stipulated by the control algorithm 206. The control algorithm 206 may include a specific cutting program, which mows the lawn along a longitudinal axis and then work each longitudinal axis in a latitudinal form within the working area defined so as to cut the grass in the working area. Other cutting programs are also possible and can be chosen base on the shape and profile of the working area of the desired operation of a user.

Preferably, as the controller 202 will communicate with each of the navigation modules of the navigation system 204, the controller 202 may, during initialisation and general operation, receive a large amount of different navigation information from each of these navigation modules 202. In order to process this navigation information so as to determine operation commands for the mower 100, the controller 202 may first apply a filter or an averaging function to all of navigation information received from the navigation system. Such a filtering function may allow the controller 202 to ignore or minimize any weighting placed on navigation information obtained from a first navigation module that appears to be incorrect when compared with navigation information obtained from other navigation modules. Example filters which can be used includes the Kalman Filter which can be applied to assist with identifying a "best fit" trend for all navigation information received by the controller and in turn, allowing anomalies, deviations or inconsistencies, which may be far away from the average or best fit trend, to be ignored or further investigated.

As an example, the controller 202 may receive navigation information from the, odometry module 220, the sonic obstacle detection module 224 and the optical surveying module 222. During processing, the odometry module 220 may have tracked that the mower 100 has travelled to a particular co-ordinate on a virtual map obtained during the initialization of the mower 100. However, according to the navigation information obtained by the IMU and the optical surveying module 222, the location of the mower 100 may be at a distance substantially far away from the co-ordinates obtained from the odometry module 220. In these instances, when the filtering function is applied to all navigation information of the sonic obstacle detection module 224, the optical surveying module 222 and the odometry module 220, the "best fit" or "average" may in turn indicate that the co-ordinates of the odometry module 220 is an anomaly, as it is completely inconsistent with the other navigation modules. Accordingly, the controller 202 may then proceed to ignore this anomaly in generating commands to the mower. It is also expected that the controller 202 may also apply a similar filtering function to all data obtained from the navigation system and other sensors such as GPS sensors, compass, cliff sensors, water sensors etc. The Extended Kalman Filter, for example, may be advantageous in they are able to reduce/eliminate bad data points from each source and to assist in determining which sources of navigation/localization data are most reliable and use select these sources instead.

In some example embodiments, the filtering function or averaging function such as the Kalman Filter can also be applied by each navigation module to any navigation information obtained before the navigation information is communicated to the controller 202. In these examples, as sensors and other electronic navigation modules are arranged to obtain data from environmental readings, it is possible that due to uncontrolled incidents or other environmental factors may cause certain readings to be incorrect within a short timeframe. Examples of these may include the mower experiencing wheel spin, and thus causing erroneous readings by the odometry module 220, or a random or accidental collision with an object, such as a football, in which case the navigation information obtained from the IMU module 226 may also be erroneous.

In these instances, by including a filtering function with each navigation module, such anomalies in the data collected by each navigation module may be filtered or "cleaned up" before it is sent to the controller 202. Thus this this would advantageous in that the navigation information sent to the controller 202 is likely to be more accurate, resulting in improved performance and less processing by the controller 202.

Figure 3:
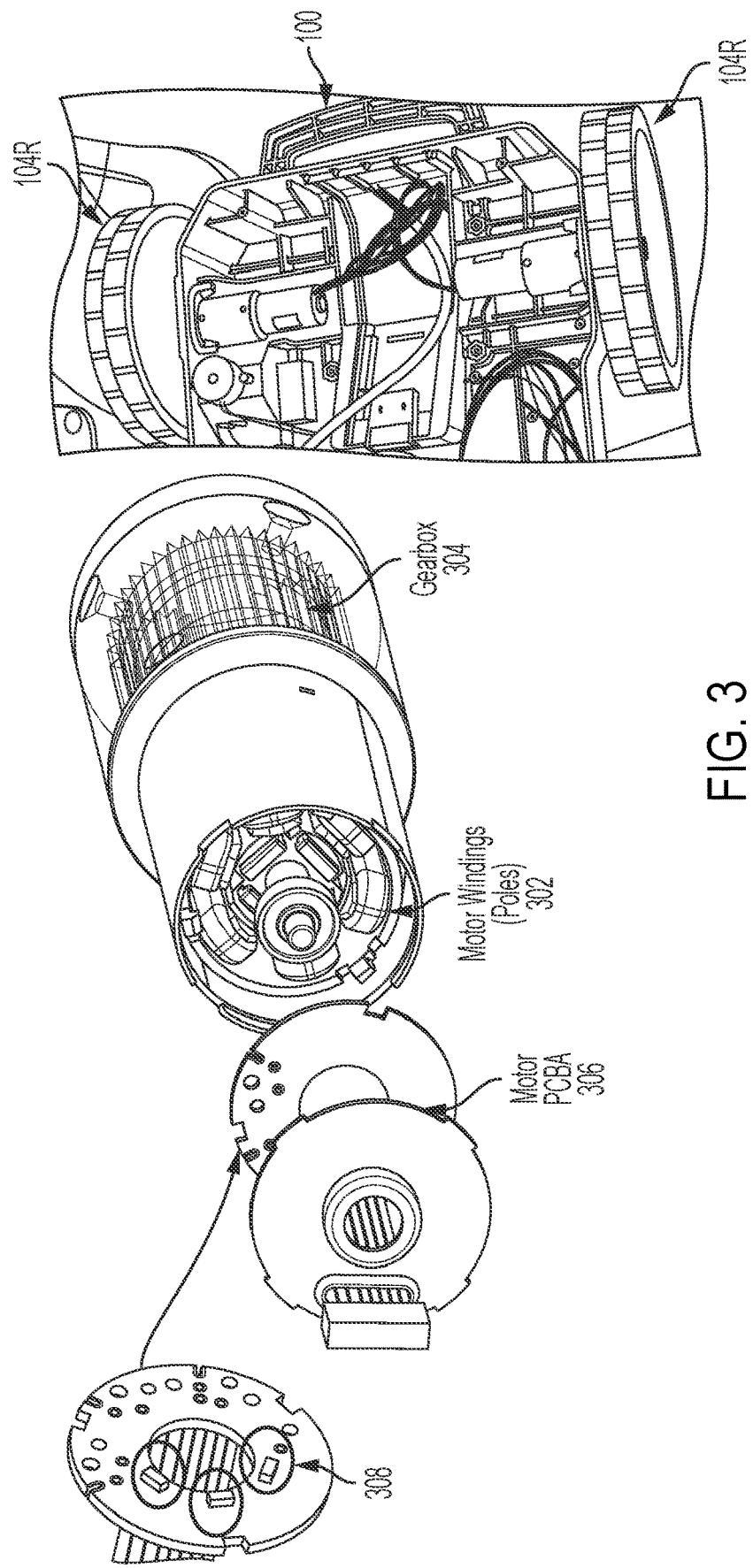
FIG. 3 is a diagram illustrating an example implementation of an odometry module on a pair of opposing wheels of the autonomous lawn mower of FIG. 1.

With reference to FIG. 3, there is illustrated an example of an odometry module 220 arranged to be implemented with an autonomous mower 100. In this example embodiment, the odometry module 220 is arranged to be implemented into each of two motors arranged to drive the rear wheels 104R of the mower 100, although as a person skilled in the art would appreciate, if additional motors are used to drive other wheels of the mower 100, than this odometry module 220 can also be implemented into each of the motor windings 302.

In this example, the odometry module 202 is arranged to measure the number of rotations of the wheels 104R to which the odometry module 202 is implemented to operate with. In turn, the number of rotations, when coupled with the circumference of the wheel 104R will provide an estimation as to the distance travelled by the mower 100 on a work surface (taking into account any gear ratios, if applicable). As the mower 100 may also turn along its work surface by allowing its opposing wheels to spin in opposite directions, such movements and rotation can also be detected and measured so as to determine the direction and rate of turn of the mower 100 along a work surface.

As illustrated in FIG. 3, the odometry module 202 is implemented onto a motor 302 and gearbox arrangement 304 which drives one of the rear wheels 104R, with each rear wheel 104R having its own motor 302 and gearbox 304. When the motor 302 is energised by its power source, in most instances by command of the controller 202, the motor will rotate 302 and thus also driving a gearbox 304 which is rotatably attached to the motor 302.

The gearbox 304 will then also transmit this rotational force to the wheels 104R and thus turning the wheels 104R in a desired direction. As the gearbox ratio is known, either by presetting at the factory, or user adjustment, the odometry module 202 can thus operate by detecting the number of rotation of the motor 302 which can in turn be used to calculate the number of rotations of the wheel 104R.

In this implementation, the motor has a Print Circuit Board (PCB) 306 connected to the motor windings 302 and rotor which is implemented with a number of hall sensors 308. These hall sensors 308 allow a magnetic signal to be detected upon each sensor 308 being rotated passed a magnet (or have a magnet rotated pass the sensor 308) and thus when the motor is rotated, the PCB 306, which is static, will detect the magnets held in the rotor of the motor 302. The hall sensors 308 located on the PCB 306 can thus detect a magnet as it is passed during the rotation of the motor windings 302. In turn, this data from the hall sensors 308 can then be used to calculate the number of or portions of rotations of the motor 302, which can then be used to calculate the number of rotations of the wheel 104R via the gearbox 304.

Once the number of rotations is determined, the number of rotations of each wheel 104R, including its direction and whether the wheels 10R are undergoing a turning direction, will then be transmitted to the controller 202 for processing. In turn, the controller 202 can then process this result with other information from the navigation system 204 to ascertain the location of the mower 100.

It is expected that the wheels of the mower 100 may undergo some wheel spin when the mower 100 is in operation, as the surface type may cause the wheels 104R to spin without moving the mower 100. Such wheel spins will result in error when determining the position of the mower 100. However, such errors are factored into the calculation by the controller 202 as other navigation information obtained by other modules of the navigation system 204 will be used to compensate for any errors of one individual navigation module.

In another example implementation, the amount of electric current drawn by the motor 302 may also be measured and compared against the rotation rate detected by the odometry module 202. In such examples, if the current drawn by the motor 302 is very low relative to the number of rotations detected of the wheel 104R, then the wheels 104R of the mower 100 may indeed be spinning along its working surface. Accordingly, such information may also be considered by the controller 202 in determining the distance of the mower 100 based on its odometry measurement.

Figure 4:
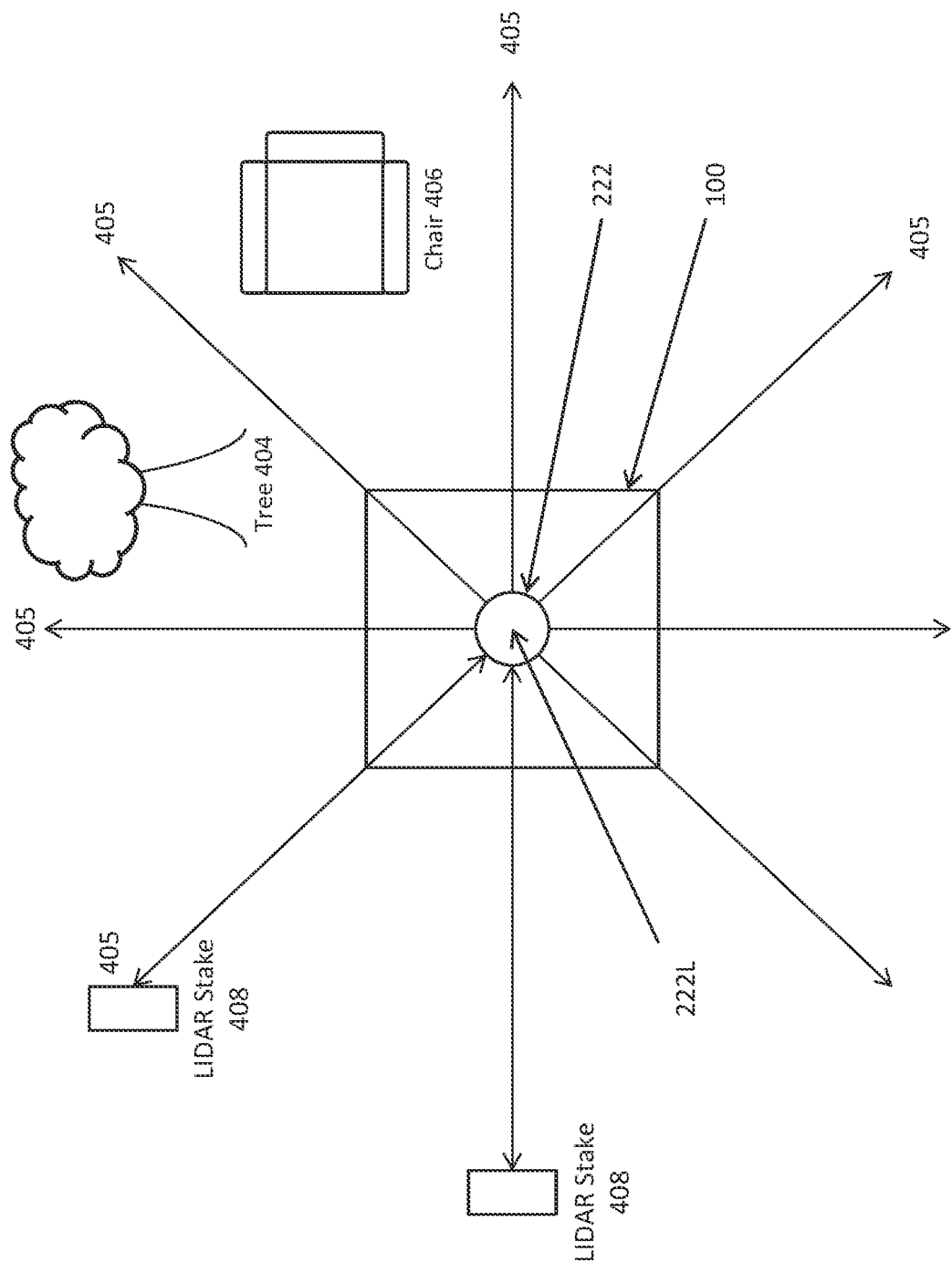
FIG. 4 is a top view of an operation of an optical surveying module for the autonomous lawn mower of FIG. 1.
Figure 5:
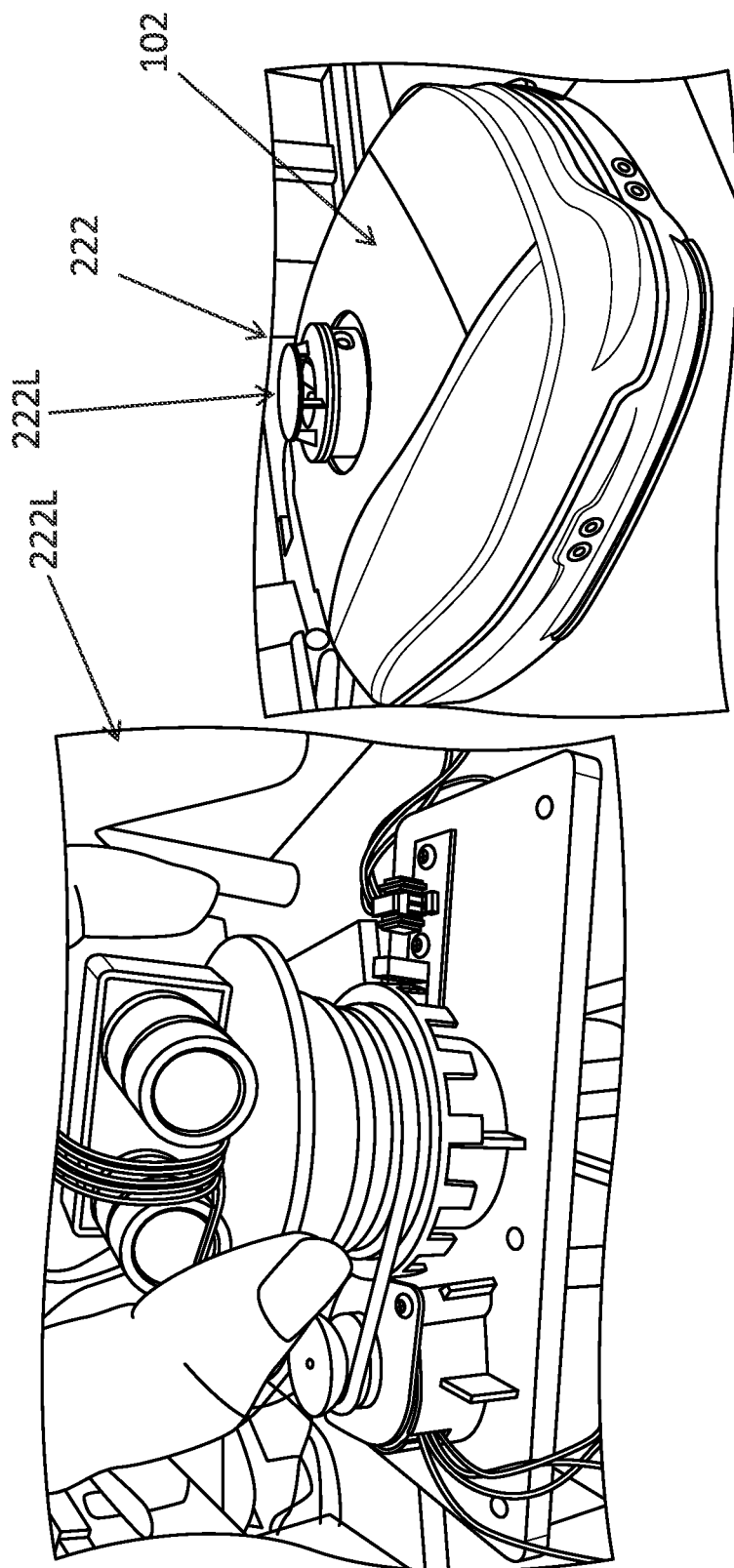
FIG. 5 are illustrations of an example implementation of an optical surveying module for the autonomous lawn mower of FIG. 1.

With reference to FIGS. 4 and 5, there is illustrated an example of an optical surveying module 222 arranged to be implemented with an autonomous mower 100. In this example embodiment, the optical surveying module 222 is implemented by the placement of a Light Detection and Ranging (LIDAR) unit 222L on the mower body 102 so as to scan and survey a surrounding area 402 to produce a dynamic map of the immediate spatial environment proximate to the mower 100.

In this example, the optical surveying module 222 is a LIDAR unit 222L on the mower body 102. The LIDAR unit 222L may be implemented to tire rapid pulses of laser light which come into contact with objects (such as the tree 404, chair 406 or LIDAR stakes 408) in the surrounding spatial environment circumferential to the mower 100.

Instrumentation that is part the LIDAR unit 222L receives the reflected laser light from these objects and measures the amount of time taken for each pulse to be reflected back to the LIDAR unit 222L. As the speed of light is known, the distance between the objects and the LIDAR unit 222L can be calculated. A dynamic map of the spatial environment proximate to the mower is built as a result of rapid successive measurements of reflected laser light.

With reference to FIG. 4, there is illustrated an example of the optical surveying module 222 scanning and surveying the surrounding environment proximate to a mower 100. The optical surveying module 222, exemplified by a LIDAR unit 222L as mentioned previously, is represented by the circle located at the centre of the square, which represents the mower 100. The arrows emanating from the circle represent the laser light 405 fired by the LIDAR unit 222L and indicate their direction of propagation. The LIDAR unit 222L surveys the spatial environment around the mower 100 by firing rapid pulses of laser light 405 that are incident on objects within the surveyed environment. In this example, such objects are a tree 404 and a chair 406. The laser light 405 is reflected from the objects and detected by the LIDAR unit 222L, and the LIDAR unit 222L may then calculate the distance between the mower 100 and the object. The map produced is dynamic because the position of the mower 100 relative to any object constantly changes since the mower 100 may move during its operation.

Also illustrated in FIG. 4 are LIDAR Stakes 408 represented by rectangles. In one example, a LIDAR Stake 408 may be composed of a plastic stake top and a stake cover. In one alternative example, a LIDAR stake 408 may be a LIDAR object or a plurality of grouped LIDAR stakes 408. Each LIDAR stake 408 may pertain to fix the LIDAR object to the lawn, and meanwhile provide a visible portion for the LIDAR system to "see" the yard. Optionally, the fixation and the visible portion may be formed integrally. The LIDAR Stake 408 is inserted vertically into the ground so that the plastic stake top remains above the surface of the ground. Laser light 405L fired from a LIDAR unit that is incident on a LIDAR Stake will be reflected back to the LIDAR unit 222L. A number of LIDAR Stakes, each suggests an image of a narrow object, may be planted in series to denote a boundary, several objects grouped closely together, or alternatively a single large object, e.g. fake, plastic rocks having a size of approximately 30 cm (L)×50 cm (W)×50 cm (H). The LIDAR unit on a mower will detect a boundary formed by a series of LIDAR Stakes and the mower will be prevented from crossing the boundary. In some advance embodiments, each of the LIDAR Stakes 408 may have a unique signature so that the LIDAR unit 222L may differentiate one LIDAR Stake 408 from another, in turn allowing the controller 202 to trigger specific operation commands, such as "no go zones" or "dedicated zones".

For example, a work surface over which a mower 100 will operate may contain a swimming pool. It is undesirable for a mower 100 to come into contact with the water in a swimming pool because this may damage the electronics within the mower 100. A series of LIDAR Stakes 408 may be inserted periodically around the perimeter of the swimming pool to form a boundary. The LIDAR unit 222L on a mower will detect this boundary and the mower will not come into contact with the pool enclosed within the boundary.

As illustrated in FIG. 5, the optical surveying module 222 may be a single LIDAR unit 222L on the mower body 102. Preferably, the LIDAR unit 222L is located centrally on the upwards-facing surface of the mower body 102 as this allow the LIDAR unit 222L to be positioned so that no other part of the mower body 102 can obstructs any laser light emanating from the LIDAR unit 222L. The LIDAR unit 222L is implemented to be driven by a motor via a gearing mechanism or belt.

In turn, this embodiment of autonomous lawn mower 100 includes a controller 202 which may be implemented as a computing device. The controller can direct electric current from a power source to the LIDAR unit's motor. When the motor is energized by its power source, in most instances by command of the controller, the motor will rotate and thus also rotating the LIDAR unit 222L. This enables circumferential coverage of the laser pulses fired from the LIDAR unit 222L.

The aforementioned controller 202 may also be preprogrammed with an initialization routine 228 which serves to initially define the mower's work area and work surfaces. During this initialization process, the LIDAR unit 222L as implemented on the mower body 102 in this example embodiment may then proceed to survey the surrounding environment and in turn identities the boundaries of a working area during an initialization process. Certain surfaces within the boundaries may also be categorized as areas to be avoided or surfaces where the blade motor should not be activated. The data gathered by the LIDAR unit 222L during this initialization routine may then be used to build a map that can be referred to as the virtual survey map 208 that can be used when the mower 100 operates autonomously.

An exemplification of an initialization routine 228 is further described below with reference to FIG. 8. As shown in FIG. 8, a house may have a front lawn and a back lawn connected by a concrete path. A LIDAR unit 222L on a mower 100 may then proceed to survey the surrounding environment and identify the cutting perimeters enclosing the front lawn and the back lawn. The controller can activate the blade motor on surfaces within this perimeter. The user may not desire the blade motor to operate along the concrete path that joins the front lawn and back lawn; hence the path taken by the mower across the concrete path is identified as a non-cutting path.

Following the execution of the initialization routine 228, the LIDAR unit 222L builds a dynamic map in real-time which can then be used to be compared with the stored survey map 208 for the purpose of identifying the mower's location on the survey map 208 and in turn, operating the mower as needed based on the location.

The utility of this process can be demonstrated through exemplification. The controller 202 may have a command to increase the height of the blade over a particular area of the mower's working area so that the grass over such area is cut longer than the grass over the rest of the working area. As the mower traverses its working area, the dynamic map produced by the LIDAR unit 222L is compared to the previously generated survey map 208, so that location of the mower is known and hence the command can be executed by the controller over the correct area of the working area.

In one example embodiment, the use of LIDAR may be a primary sensor for the navigation and localization of the autonomous mower 100. The LIDAR, or also known as the LIDAR Unit or LIDAR module, may include a laser module mounted to a rotatable base. The laser module includes a laser or LED sender which sends out a light pulse or signal and a receiver that receives the rebounded pulse or signal along with other electronics for control and filtering.

In turn, these pulses or signals captured by the receiver may then be compared to the signal sent by the laser/LED and processed to determine how far away the object that rebounded is from the system. Preferably, the rotation of the laser module is controlled and synchronized with the action of the laser module so that a 2-dimensional map of the area surrounding the LIDAR can be obtained.

In one example, the frequency of the laser module and rotating unit determines the measurement sensitivity of the LIDAR unit. In one example embodiment of the mower 100, it is preferred that the LIDAR unit will be used preliminarily in order to create a virtual map of the lawn environment as the mower is electronically walked around the lawn boundary and any fixed obstacles within said boundary during the initialization process. This virtual map may then be saved in the mower's memory or storage.

When the mower 100 is operated to perform autonomous cutting or at any time when the mower 100 is operating away from its docking station, the LIDAR system may be arranged to scan and compare what it is currently detecting against the stored virtual map in order to determine the mower's position within the known garden. The LIDAR could also be used for obstacle avoidance by in some examples where the mower was programmed to avoid detected obstacles that are not part of the mapped lawn.

Alternatively, the navigation and localization of the autonomous mower 100 may be achieved by camera/visual sensor based navigation methods such as visual Simultaneous Localization and Mapping (vSLAM).

Figure 6:
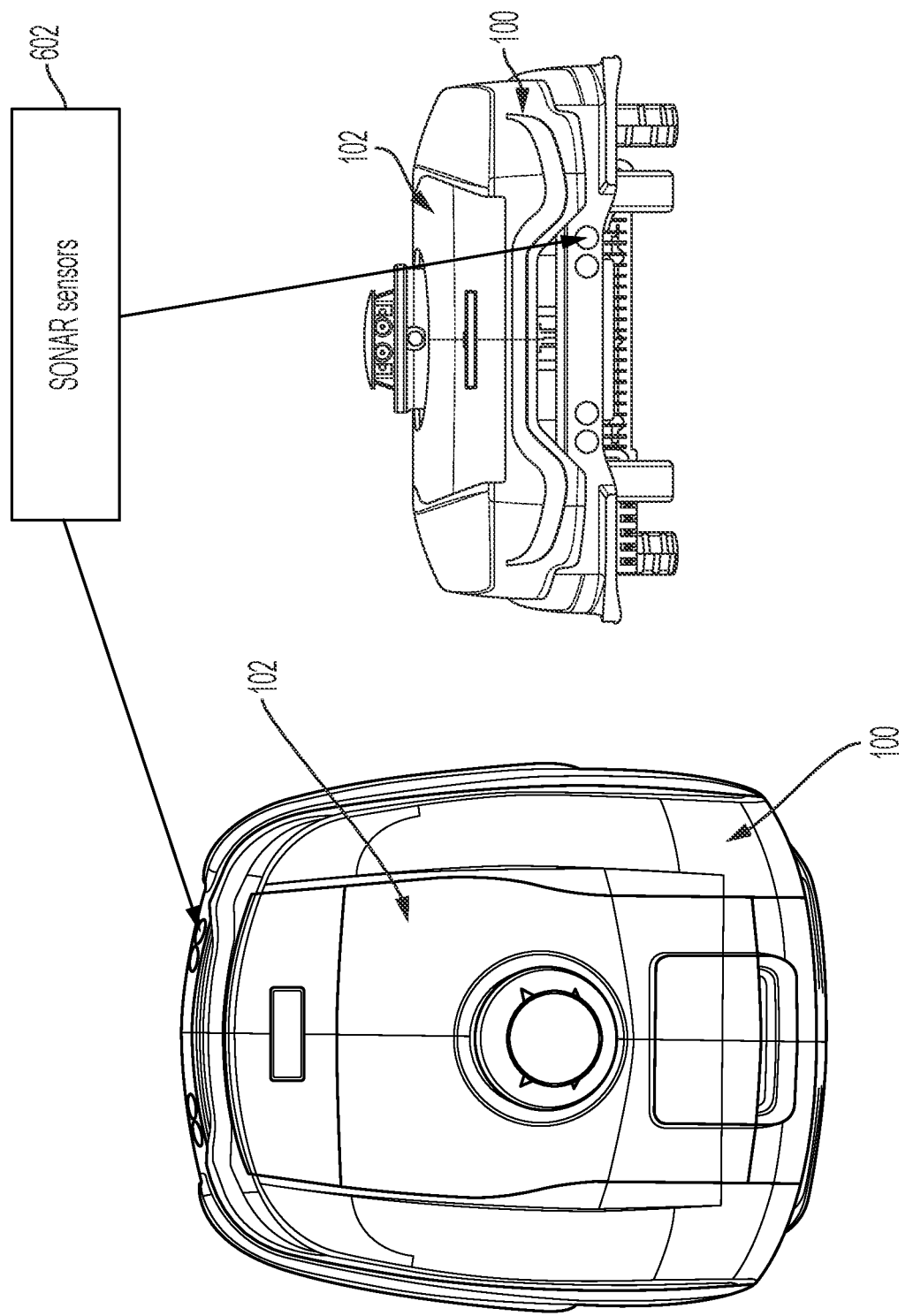
FIG. 6 is a top and front view of an example implementation of a sonic obstacle detection module for the autonomous lawn mower of FIG. 1.

With reference to FIG. 6, there is illustrated an example of sonic obstacle detection module 224 arranged to be implemented with an autonomous mower 100. In this example embodiment, the sonic obstacle detection module 224 is implemented by the placement of Sound Navigation and Ranging (SONAR) sensors 602 on the mower 100 to use sound waves to detect if there are any obstacles proximate to the mower 100 so as to assist the mower with avoiding these obstacles.

In this example, the sonic obstacle detection module 224 is implemented with a plurality of SONAR sensors 602 on the mower body 102. The SONAR sensors 602 fire pulses of sound waves which come into contact with objects in the surrounding spatial environment in front of the mower 100.

Instrumentation that is part a SONAR sensor 602 receives the reflected pulse (echo) and measures the amount of time taken for each pulse to be reflected back to the SONAR sensor 602. As the speed of sound is known, the distance between the objects and the SONAR sensors can be calculated.

As illustrated in FIG. 6, the sonic obstacle detection module 202 may include four SONAR sensors 602 on the mower body 102. Preferably, the four SONAR sensors 602 may be located on the front-facing surface of the mower body as this allows the sensors 602 to detect obstacles in the path of forward travel. The four SONAR sensors 602 are positioned such that no part of the mower body 102 obstructs any pulses of sound emanating from the SONAR sensors 602.

As shown in FIG. 6, the SONAR sensors may be located on the front-facing surface of the mower body 102 in order to detect object(s) positioned in front of the mower 100 in the direction of the mower's motion, although it is possible to also have sonar sensors 602 implemented on the side and rear of the mower body 102. Detecting object(s) that may obstruct the motion of the mower 100 would enable the controller to execute appropriate commands to avoid colliding with said object(s).

For example, a work surface over which a mower 100 will operate may contain an object, such as a chair at some distance away from the mower 100 which the SONAR sensors 602 detect. The controller 202 may in turn be arranged to receive this navigation information and, after processing this navigation information, will generate an appropriate command necessary to avoiding this obstacle. Such commands may include a change of the direction of motion of the mower, stopping the motion of the mower, or shutting off the cutting mechanism of the mower depending on the information received from the sensors.

The navigation information of the sonar sensors 602 is particularly useful as obstacles may be placed in front of the mower 100 during its operation or may otherwise not be detected during the initialisation procedures. This is because an operation area of the mower 100, such as a yard, may have traffic from humans, animals or other objects which changes the number of obstacles in a work environment. The sonar sensors 602 are thus able to detect these obstacles and in turn allow the controller 202 to adjust the operation of the mower 100 to accommodate for these obstacles. The sonar sensors 602 may also be helpful as it may be implemented to have a short scope of vision and thus the sensors 602 may be mounted lower on the mower to see objects that are not tall enough to be seen by the LIDAR units. Furthermore, whilst a LIDAR unit may in theory replace the sonar sensors 602, sonar sensors 602 may be cheaper to implement, particularly for lower portions of the mower where obstacle avoidance is advantageous.

In one example embodiment, the mower 100 may use a plurality of SONAR modules (SONAR) about the edges of the unit to prevent bumping and/or scraping side obtrusions. For instance, a SONAR located and facing outwards from the front of the unit is used for obstacle avoidance. This SONAR may be arranged to be capable of identifying obstacles in front of the unit and notifies the mower. The mower may then check the location of the obstruction against the known lawn map (or virtual map) created and saved from the mower's LIDAR system and uses the information of the obstacle in front of it in conjunction with the information of the known lawn map to navigate around/away from the object.

This example is advantageous in that such an arrangement as described is not standard for many existing autonomous mowers as most current mowers use the bumping sensors to detect objects and change direction.

Preferably, in another example, the mower 100 may also have an additional set of SONAR on the right side of the unit which is the same side as the perimeter cutter. As some example mowers 100 may have an edge mowing function in which the mower traces around the edge of the mapped boundary and uses a secondary cutting mechanism to trim the grass closer to the edge than the primary cutting means is able. The side SONAR may in turn be used to measure the distance from the edge of the mower to objects, such as fences, along the boundary in order to allow the mower to navigate close to the object, but avoid bumping and thus scratching the mower's top cover to keep a nicer appearance.

Figure 7:
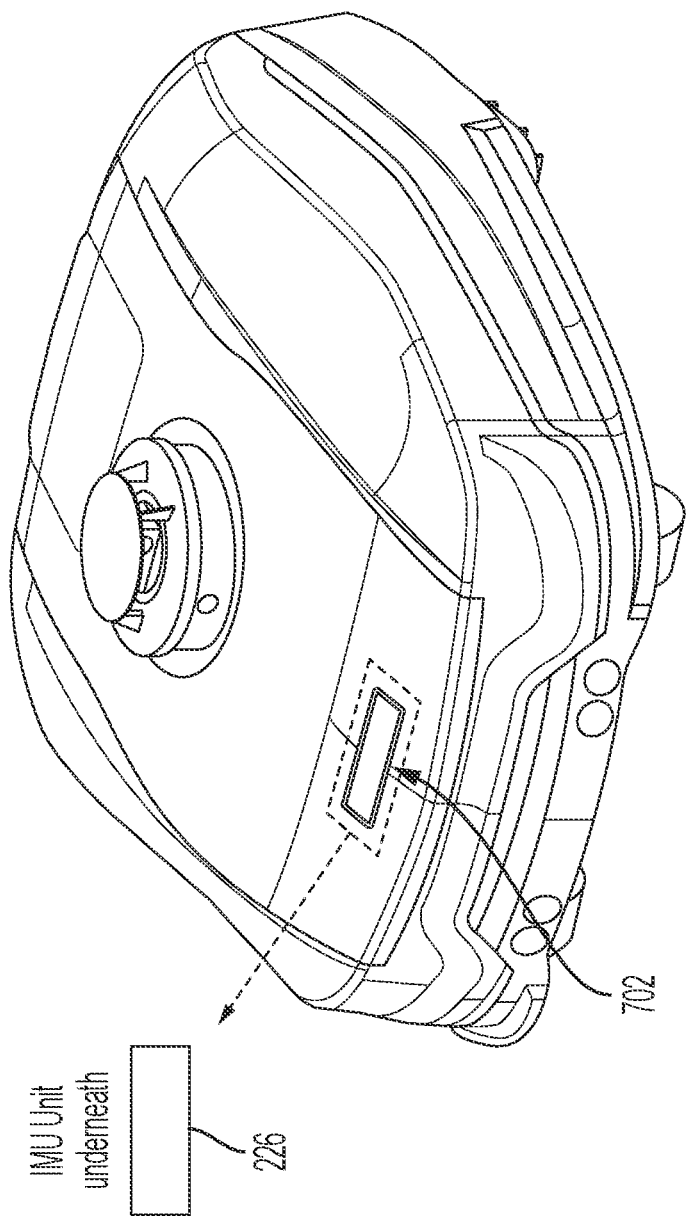
FIG. 7 is a perspective view of an example placement of an inertial measurement unit (IMU) module for the autonomous lawn mower of FIG. 1.

With reference to FIG. 7, there is illustrated an example of an inertial measurement unit (IMU) module 226 arranged to be implemented with an autonomous mower 100. In this example embodiment, the IMU module 226 is implemented by the placement of a removable IMU unit within the body of the mower 100 which is arranged to measure the force of movement of the mower by detecting and recording various forces which are subjected to the mower 100.

In this example, the IMU module 226 is a removable IMU unit within the body 102 of the mower 100. The IMU 226 detects and records various forces which are subjected on the mower 100, including the direction of movement, force of movement, magnetic bearing of movement, acceleration and gyroscopic movements. Preferably, the IMU 226 functions by using at least one accelerometer to detect the rate of acceleration or deceleration of the mower, at least one gyroscope to detect the gyroscopic movements of the mower and a magnetometer to detect the magnetic bearing of movement of the mower. The IMU may also further comprise an IMU chip and power supply, such as a battery such that it can continue to be energized when it is removed from the mower 100.

As shown in FIG. 2, the IMU module 226 is connected to the controller 202. The controller 202 may be implemented as a computing device which is arranged to receive the navigation information detected by the IMU module 226. Following processing by a processor, suitable commands to operate the mower 10 can be developed based on the navigation information supplied by the IMU module 226.

As illustrated in FIG. 7, the IMU module 226 is implemented within the body of the mower 100 as an electronic component. The IMU module 226 is represented by a rectangle and a possible position of the IMU is indicated by an arrow, being placed below a removable or latched on logo plate which acts as a door to access the IMU 226. Preferably, the IMU 226 is placed below an openable cover 702 marked by the mower's manufacturer's logo on the upward-facing surface of the mower. The openable cover would allow access to the IMU 226, whilst protecting the IMU 226 from debris and moisture. Once the cover is opened, a user can then remove the IMU 226 by lifting it out.

The advantage of a mower 100 in having a removable IMU 226 is that the calibration of the IMU 226 would be much simpler. As the IMU 226 may detect at least the acceleration and gyroscopic movements of a unit, it may be required to undergo calibration after shipping such that it can be calibrated for its full range of movement. In this sense, by allowing the IMU 226 to be removable, the user can calibrate the IMU 226 for the mower by moving it in all three dimensions, such as by shaking or moving the IMU in their hand without having to shake or move the entire autonomous mower 100. To achieve this, the IMU may only be connected to the mower via a cable, and thus allowing a user to shake or move the IMU, although in some examples, where the IMU is entirely removable from the mower, the IMU may have its own power supply to remain functional when it is removed entirely from the mower body and thus it may have its own battery or capacitor to store sufficient power for the calibration process.

As an example, as part of an initialization process a user may be required to calibrate the IMU 226. A user would remove the IMU 226 from the mower body 102 and move the IMU 226 in a "figure of 8" pattern in order to give the accelerometer and gyroscope components of the IMU a varied range of accelerations and gyroscopic motions to detect and record. Being able to remove the IMU for this purpose is advantageous as the IMU 226 is easier to handle and manipulate when compared with having to perform the same actions with an entire mower 100, which would be more heavy, cumbersome and potentially dangerous.

Figure 8:
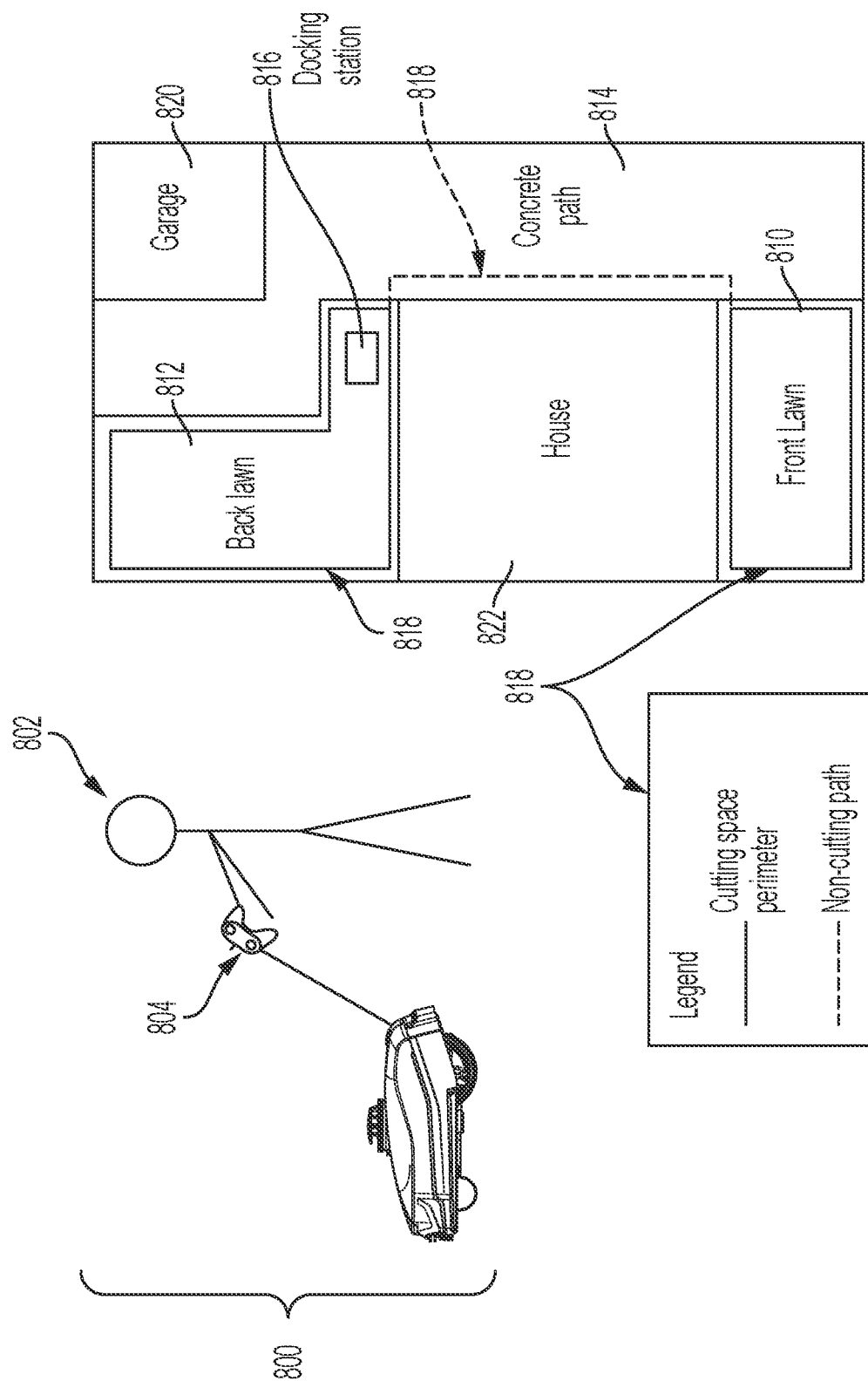
FIG. 8 is an example block diagram illustrating an example operation of an initialisation process for the autonomous lawn mower of FIG. 1.

With reference to FIG. 8, there is illustrated an example of an initialisation process for the autonomous mower 100. In this example, the initialisation process or routine 228, is a set of procedures which may be performed by a user so as to initialise the mower 100 for self-operation in a work area.

To initialise the mower 100 for operation, the user may proceed to teach the mower 100 the boundaries for operation. In so doing, the mower 100 can then be taught by the user as to the location and definition of the working area as well as any travel paths which are required to get to the different portions of the working area.

As shown in this example, the user can firstly manual operate the mower 100 along the perimeters of one or more operation areas so as to teach the mower the operation areas which are needed to be mowed by the mower. The mower can be operated in this mode by having a handheld controller 804 to be operated by a user 802. In this embodiment, the handheld controller 804 may include a number of switches and a joystick similar to that of a gaming controller which allows a user 802 to drive the mower 100 along the perimeters of the operating surface. This may sometimes be referred to as the "dog walking mode" 800, representative of a user in "walking" the mower along a path.

When the user 802 drives the mower 100 along these perimeters, the mower 100, which would be in an initialization mode (or called the dog walking mode), may then operate its navigation system so as to continuously create navigation information associated with its proximate environment. This may include, for example:
  the odometry module 220 in recording the distance of travel as well as the direction of travel;
  the IMU 226 in measuring the direction of travel;
  the sonic obstacle detection module 224 in detecting obstacles, recording the location of these obstacles;
  the optical surveying module 222 in surveying the proximate area around the mower and recording the location of obstacles, LIDAR stakes etc to create a virtual map of the areas around the mower; and,
  Any other navigation modules or sensors (e.g. GPS etc) which may contribute towards refining the navigation information.

Once this navigation information is created, the mower 100 may then store this navigation information for use in autonomous operation. This stored navigation information, which may be in the form of a virtual map, may then be processed by the mower 100 with new navigation information that is obtained in real time by the navigation system during mower operation to devise the location of the mower 100 when in operation.

In one example, as shown in FIG. 8, the user may start the initialization process by firstly "dog walking" 800 the mower 100 around its operating areas so as to define the operating areas in which the mower 100 will operate. As it can be seen, a user's home may include a front lawn 810 and a back lawn 812 with a concrete path 814 in between the front lawn and back lawn. In this case, the user may start the dog walking process 800 by firstly controlling the mower 100 from the mower docking station 816, which is the base for which the mower 100 may operate from. This docking station 816 may provide a base for the mower and can provide several functions, including diagnostic, connectivity to external devices and recharging capabilities.

Once the user starts the dog walking process 800, the user can drive the mower 100 from the docking station 816 to a perimeter 818 of the work area and select on the handheld controller 804 to start recording the perimeter 818. The user can then drive the mower around the perimeter 818 of their back lawn 812, as an example and in turn, allow the back lawn 812 to be marked by the mower 100 as a first work area. During this time, the mower 100 is continuously operating its navigation system so as to survey the first work area, including the distance of travel of the perimeter 818, the direction of travel and any obstacles which can be used as a reference to assist with its navigation such as the docking station 816, garage 820 and house 822.

The user may then drive the mower onto the concrete path 814 so as to move the mower 100 towards the front lawn 810 to set a second work area for the mower 100. In this example, the user can then drive the mower along the concrete path 816 towards the front lawn 810 and simultaneously, set the mower to travel mode whilst the mower is on the concrete path 814. This travel mode would set that this path travelled by the mower is for the transportation of the mower towards a second work area and thus the blades of the mower 100 do not need to be powered (as there is no grass to be cut in during its movement on the concrete path). This is advantageous in that power can be saved if the concrete path 814 is of some distance, thus extending the operation of the mower 100 as well as enhancing the safety of the mower 100 as the operation of the blades is minimized. During its drive through the concrete path, the mower 100 is continuously activating its navigation system so as to survey the areas around the path to its second operating area (front lawn 810).

Once the mower reaches the front lawn 810, the user can drive the mower along the perimeter 818 of the front lawn so as to set the working area of the front lawn 810. In a similar manner to that of the back lawn 812, the mower is once again surveying its surrounding areas with its navigation system.

After the work area is defined, the user may then drive the mower 100 back to its docking station 816 which will in turn record a return path for the mower 100. However, as the navigation system of the mower can survey its surrounding areas, it may be able to find its path back to the docking station 816 since its travel paths have previously been recorded when the user had driven the mower from the docking station 816 to the front lawn 810.

Figure 9:
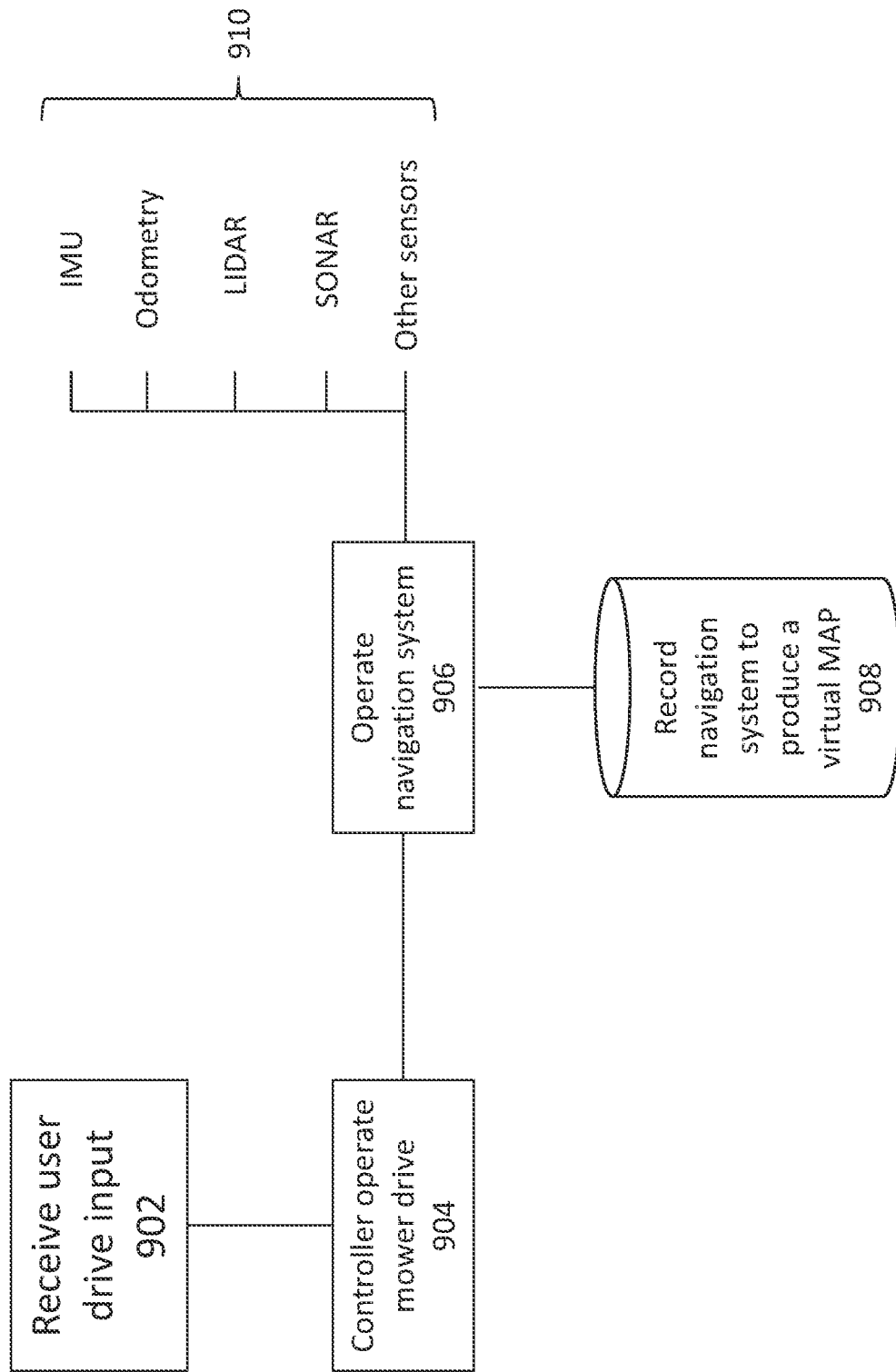
FIG. 9 is a block diagram illustrated the process flow of the initialisation process of FIG. 8.

With reference to FIG. 9, there is provided a block diagram illustrating the process flow of the initialization process of the autonomous mower 100. As illustrated in this Figure, the user may start to issue commands to the mower to drive the mower. These commands are received (902) and processed (904) by the controller 202 so as to drive the mower 100 along a surface.

Meanwhile, the navigation system is operated (906) so as continuously survey and records any navigation information for the mower during its initialization process. The navigation system may then active each of its navigation modules 910 (IMU, Odometry, SONAR, LIDAR and other sensors) to record such navigation information (908) which can be used for navigation purposes when the mower is put into autonomous operation.

Figure 10:
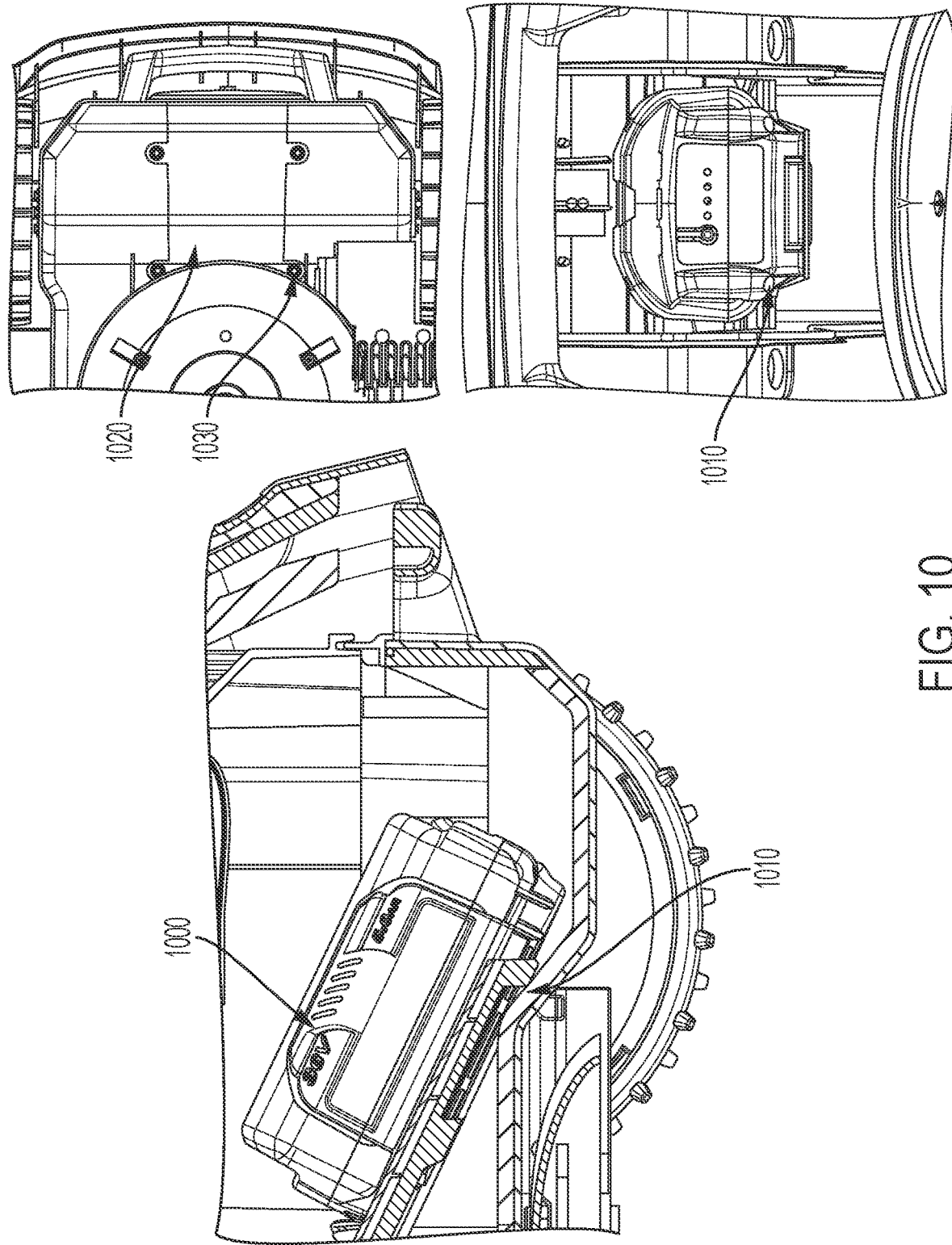
FIG. 10 are illustrations of an example implementation of a battery module for the autonomous lawn mower of FIG. 1.

With reference to FIG. 10, there is provided an illustration of an autonomous lawn mower 100 comprising: a mower body 102 having at least one motor arranged to drive a cutting blade 212b and to propel the mower body 102 on an operating surface via a wheel arrangement, wherein the mower body 102 includes a navigation system 204 arranged to assist a controller 202 to control the operation of the mower body 102 within a predefined operating area; and a battery module 1000 arranged to provide power supply to the motor; wherein the battery module 1000 is placed at a lower position within the rear mower body 102.

In this embodiment as shown in FIG. 10, the autonomous lawn mower 100 is provided a battery module 1000 within the rear mower body 102 at a lower position adjacent to and between the two rear wheels. The battery module 1000 is received by a battery holder 1010 resting on the mower body 102 and positioned at a titled angle with respect to the operating surface. For instance, one end of the battery module 1000 is projected downwards and towards the rear end of the mower body 102, such that the user may access the battery module 1000 through an opening of the lower rear mower body 102.

Preferably, the mower body is further provided a battery cover 1020 to enclose the opening of the mower body 102, thereby preventing any dust or mowed grass from reaching the interior of the mower body 102. Optionally, the battery cover 1020 may be secured to the mower body 102 firmly by coupling means 1030 such as screws.

Figure 11:
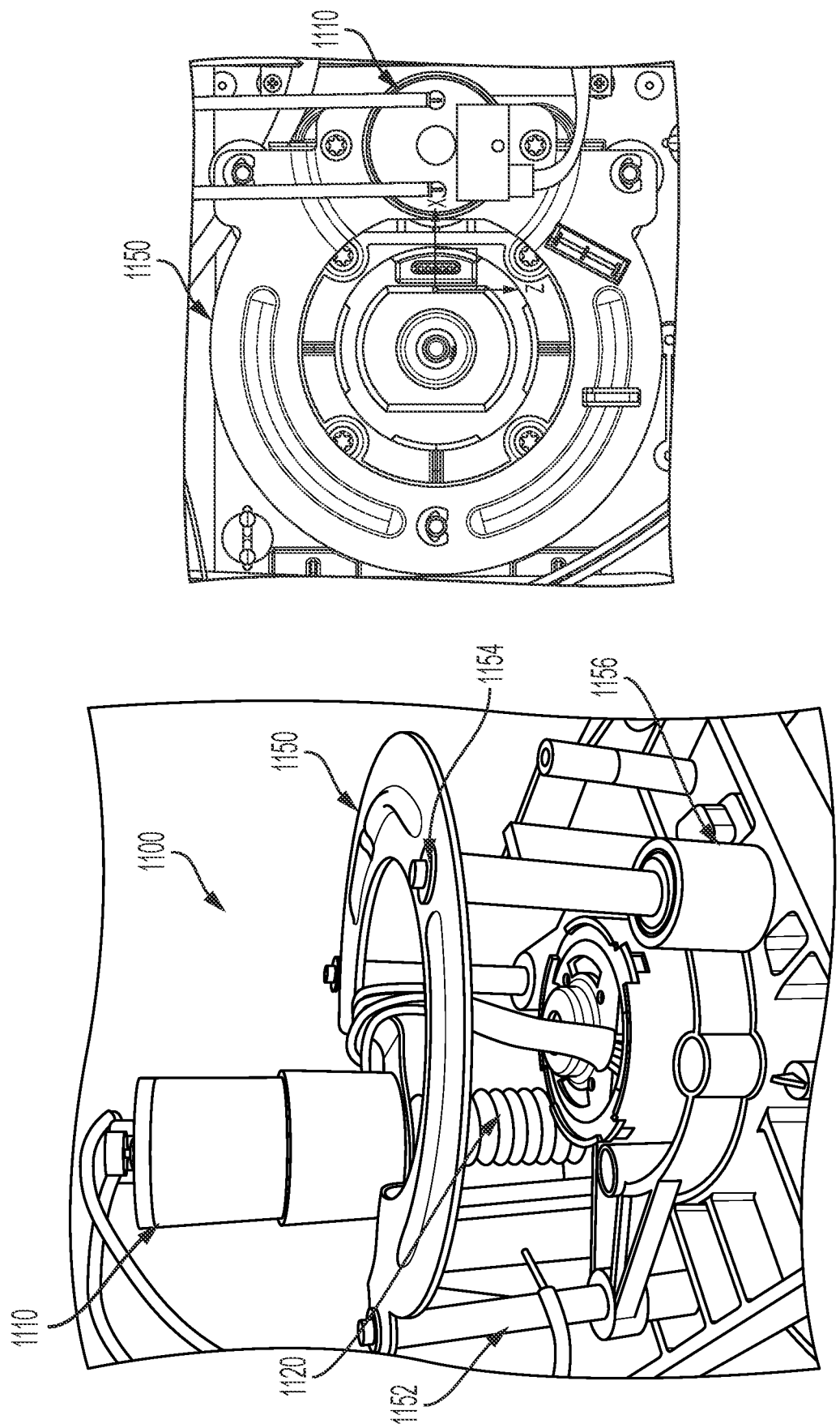
FIG. 11 are illustrations of an example implementation of a height adjustment system for the autonomous lawn mower of FIG. 1.
Figure 12:
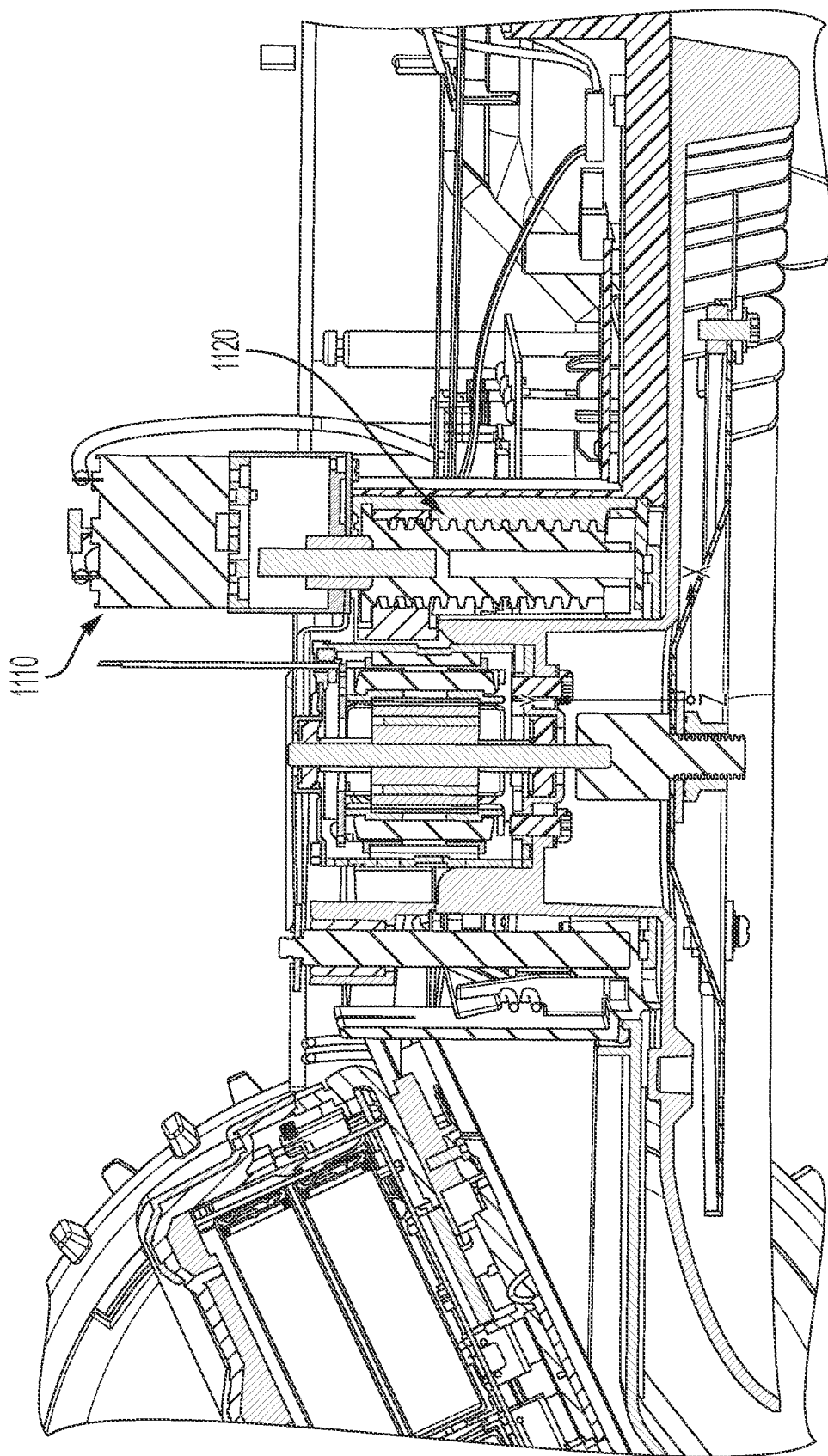
FIG. 12 is a diagram illustrating an example implementation of the height adjustment system of FIG. 12.
Figure 13:
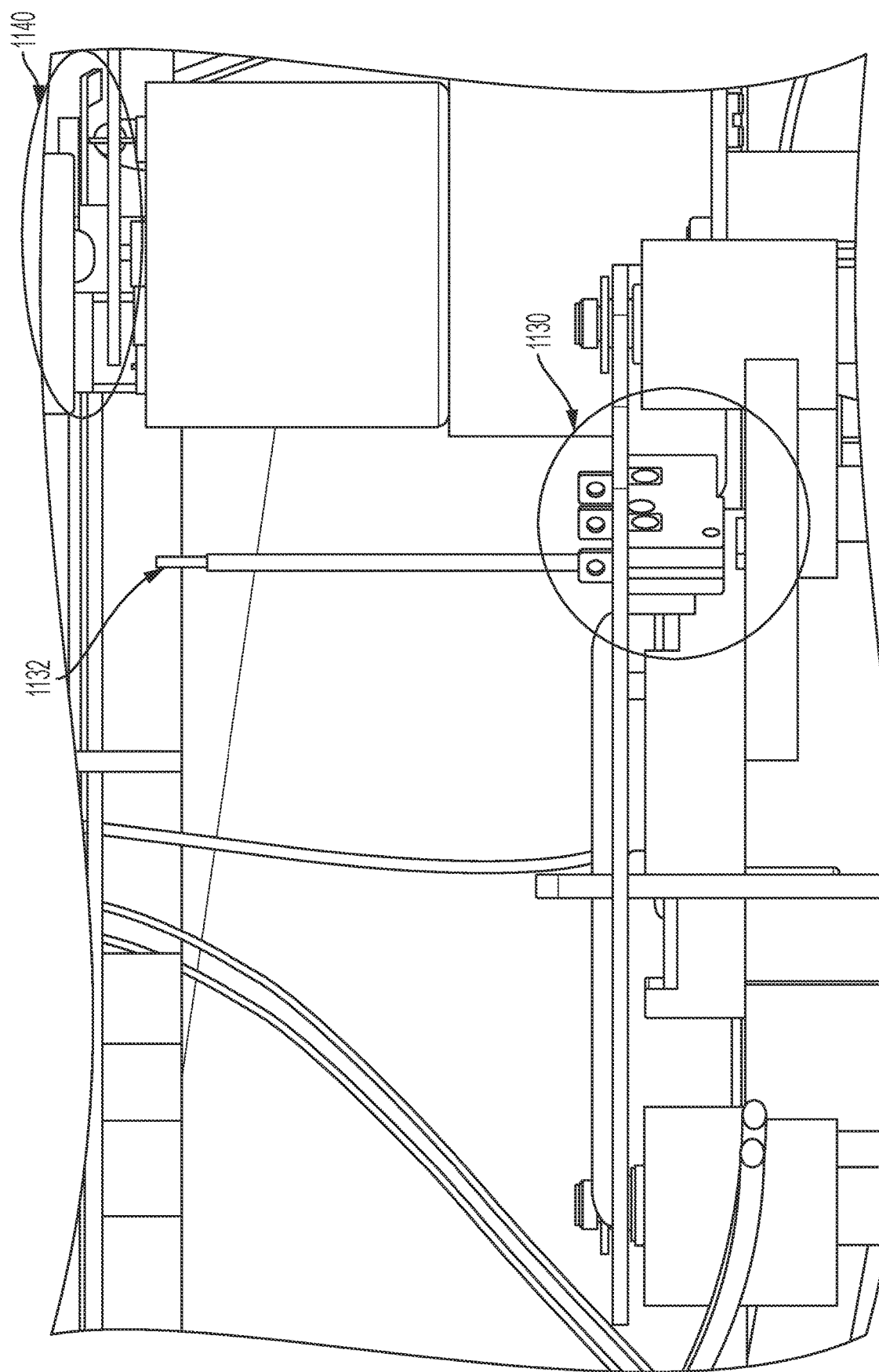
FIG. 13 is yet another illustration of an example implementation of the height adjustment system of FIG. 12.

With reference to FIGS. 11 to 13, there is provided an illustration of an autonomous lawn mower 100 comprising: a mower body 102 having at least one motor arranged to drive a cutting blade 212b and to propel the mower body 102 on an operating surface via a wheel arrangement, wherein the mower body 102 includes a navigation system 204 arranged to assist a controller 202 to control the operation of the mower body 102 within a predefined operating area; wherein the mower body 102 further includes a height adjustment system 1100 arranged to assist the controller 202 to control the operation of the cutting blade 212b within a predefined operating height.

In this embodiment as shown in FIGS. 11 to 13, the autonomous lawn mower 100 includes a height adjustment system 1100 comprising a height adjustment motor 1110, a worm shaft 1120 driven by the height adjustment motor 1110, a micro switch 1130, and a hall sensor 1140. Advantageously, the motor 1110 may manipulate the rotating direction of the worm shaft 1120 in clockwise or anticlockwise directions, such that the height of the cutting blade 212b with respect to the operating surface may be manipulated by the motor 1110 indirectly.

The motor 1110 may be secured to the mower body 102 and remains stationary throughout the height adjusting operations. For instance, the cutting blade 212b may be moved towards the operating surface when the worm shaft 1120 rotates in a clockwise direction, and on the other hand, moved further away from the operating surface when the worm shaft 1120 rotates in an anti-clockwise direction.

Optionally, the mechanical transmission between the motor 1110 and the cutting blade 212b through the worm shaft 1120 may be enhanced by the use of a ring shaped structure 1150. In this embodiment, the ring shaped structure 1150 preferably comprises a plurality of bushings 1152, e.g. made of Polyoxymethylene (POM), a plurality of linear bearings 1156, or alternatively a combination thereof for supporting the height adjustment system 1100. Advantageously, the linear bearing 1156 may counter the torsional force induced by the distance between the worm shaft 1120 and the opposite support.

In one embodiment, the plurality of bushings 1152 may be disposed about the blade motor 212. A plurality of through holes 1154 may be disposed preferably equidistantly for receiving these bushings 1152, and at least one linear bearing 1156 may be disposed about the lower end of the bushing 1152 opposed to the worm shaft 1120. During the height adjusting operation, the ring shaped structure 1150 may reinforce the worm shaft 1120, such that the rotational force of the motor 1110 is converted into lateral forces steadily without out any vibrations or at least with minimal vibrations.

Although the worm shaft 1120 is located eccentrically to the central axis of the height adjustment system 1100 and it may inevitably exert a side loading against the height adjustment system 1100, the linear bearing 1156 may advantageously reduce the friction between the shall 1120 and the ring shaped structure 1150 due to the bending moment. Accordingly, the rotational force of the motor 1110 is converted into lateral forces steadily without transmitting the bending moment to the height adjustment system 1100.

In this embodiment as shown in FIG. 13, the micro switch 1130 is disposed on the blade motor 212, with a thin and elongated portion 1132 further extended away from the blade motor 212 and towards the inner mower body 102. Preferably, the hall sensor 1140 is disposed on top of the motor 1110 for detecting the presence of the elongated portion 1132 of the micro switch 1130, thereby determining if the cutting blade 212*b* has reached the maximum height with respect to the operating surface. Advantageously, the hall sensor 1140 may further derive the number of rotations required by the motor 1110 to reach the predefined desirable operating height, and in turn assist the controller 202 to control the operation of the cutting blade 212*b*.

Optionally, the combination of micro switch 1130 and hall sensor 1140 may be substituted by sensors e.g. photoelectric sensors. For instance, the photoelectric sensor may provide a signal to the height adjustment system 1100, indicating the height position of the cutting blade 212*b*, upon detecting the presence of the elongated portion 1132, or alternatively in the absence of the elongated portion 1132. It would also be appreciated by person skilled in the art that the sensing function may be achieved by other alternative sensing means.

Figure 14:
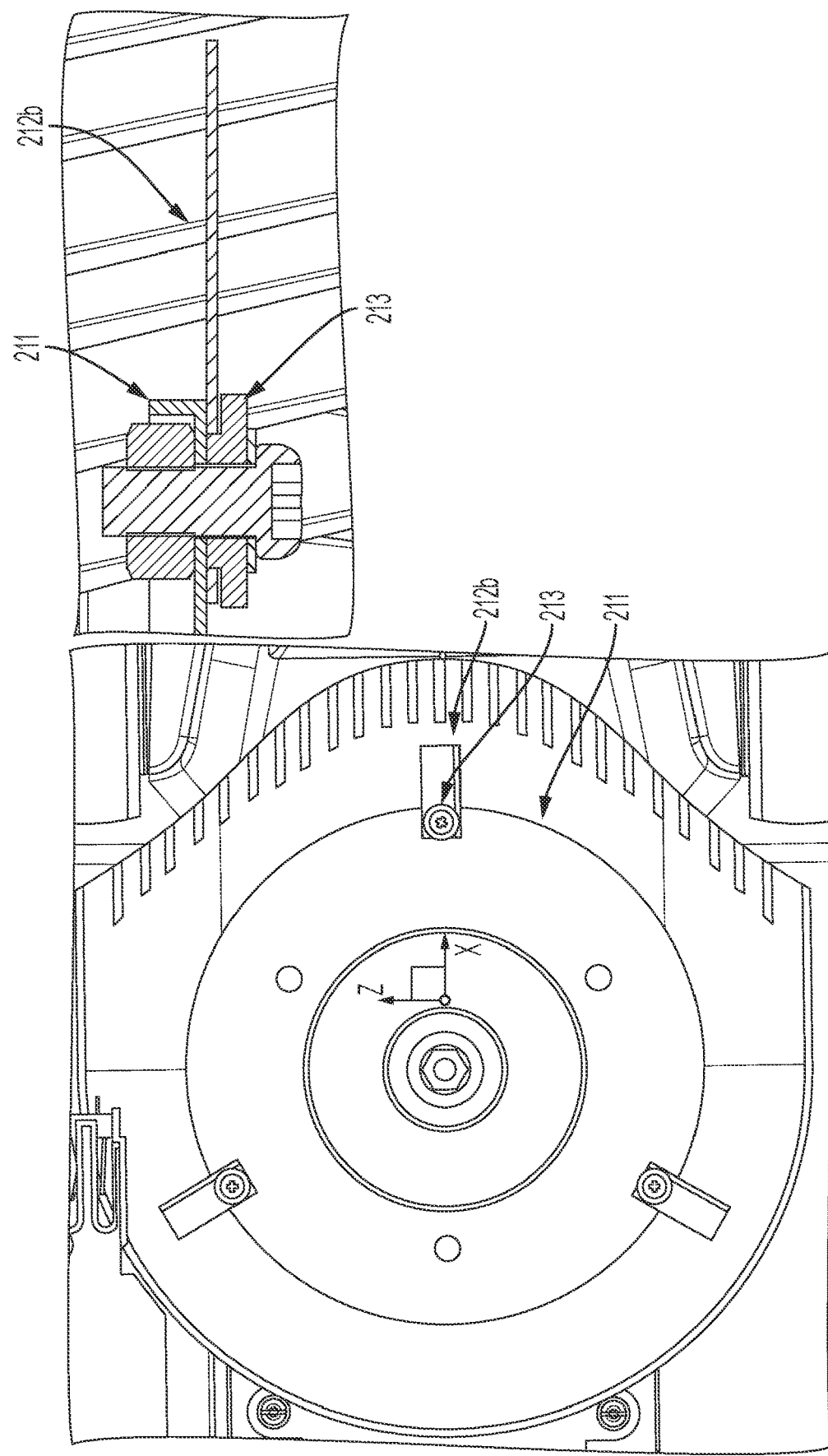
FIG. 14 are illustrations of an example implementation of cutting blades arrangement for the autonomous lawn mower of FIG. 1.

With reference to FIG. 14, there is provided an illustration of an autonomous lawn mower 100 comprising: a mower body 102 having at least one motor arranged to drive a cutting blade 212*b* and to propel the mower body 102 on an operating surface via a wheel arrangement, wherein the mower body 102 includes a navigation system 204 arranged to assist a controller 202 to control the operation of the mower body 102 within a predefined operating area; wherein the cutting blade 212*b* is pivotally connected to and driven by a motor-driven disc 211.

In this embodiment as shown in FIG. 14, the autonomous lawn mower 100 further includes a motor-driven disc 211, a plurality of cutting blades 212*b* e.g. razor blades attached to the outer circumference of the motor-driven disc 211 through a specific arrangement. In this arrangement, the cutting blades 212*b* are mounted to the motor-driven disc 211 with a spacer 213 therebetween, such that the cutting blades 212*b* are not fixed and allowed for certain degree of free rotations.

For instance, the cutting blade 212*b* may swing in a first direction corresponds to the rotating direction of the motor/motor-driven disc 211 by the motor-driven disc 211 i.e. swing outward for cutting operation, and alternatively, swing in a second direction opposite to the first direction or the rotating direction of the motor/motor-driven disc 211 i.e. swing inward and away from the obstacles if the cutting blade 212*b* contacts any obstacles.

This is especially advantageous over conventional lawn mowers where the object to be trimmed is surrounded by obstacles with high stiffness. In such situation, by allowing the cutting blade 212*b* to swing back and forth, this arrangement acts as a resilient means for damping the impact force exerted on the cutting blade 212*b* by the obstacle, such that the cutting blade 212*b* may swing inward without absorbing the force by the engaging mechanism i.e. the spacer 213 between the cutting blades 212*b* and the motor-driven disc 211.

Subsequently, the cutting blade 212*b* may swing towards the object to be trimmed through the centrifugal force of the motor-driven disc 211. This ensures that the desired orientation of the cutting blades 212*b* is maintained throughout the trimming operation, such that the sharp edge on the cutting blades 212*b* is always facing/normal to the object to be trimmed.

While conventional lawn mowers require frequent adjustment of the cutting blades orientation, and at worst, the replacement of the screws fixing the cutting blades to the motor-driven disc after a short operating cycle, the present embodiment provides an enhanced trimming experience, for example, prolonged lifespan, less maintenance or repairing over conventional lawn mowers.

Figure 15:
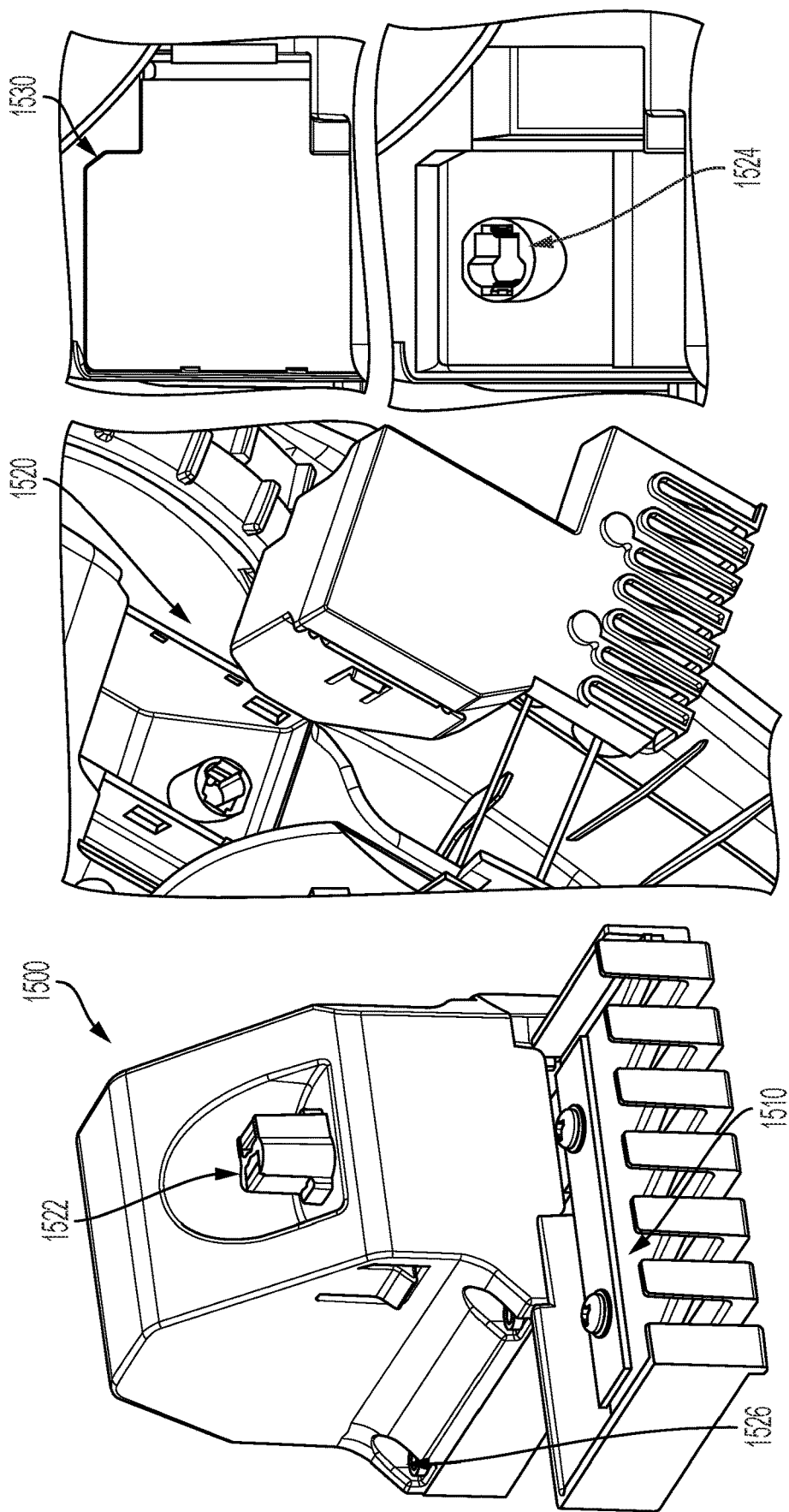
FIG. 15 are illustrations of an example implementation of a cutter module for the autonomous lawn mower of FIG. 1.

With reference to FIG. 15, there is provided an illustration of an autonomous lawn mower 100 comprising: a mower body 102 having at least one motor arranged to drive a cutting blade 212*b* and to propel the mower body 102 on an operating surface via a wheel arrangement, wherein the mower body 102 includes a navigation system 204 arranged to assist a controller 202 to control the operation of the mower body 102 within a predefined operating area; wherein the mower body 102 further includes a cutter module 1500 arranged to trim the edges of the predefined operating area.

In this embodiment as shown in FIG. 15, the autonomous lawn mower 100 includes a cutter module 1500 comprising a perimeter cutter 1510 for trimming the edges of a predefined operating area, and a locking mechanism 1520 for engaging the cutter module 1500 with the mower body 102. For instance, the locking mechanism 1520 may provide a male mating portion 1522 on the cutter module 1500 for engaging with a female mating portion 1524 provided on the mower body 102 positioned e.g. underneath the mower body 102 and adjacent to the operating circumference of the cutting blade 212*b*, such that the mower body 102 and the cutter module 1500 are electrically communicated.

Advantageously, the locking mechanism 1520 may further provide a push button 1526 to disengage the male mating portion 1522 from the female mating portion 1524, thereby removing the cutter module 1500 from the mower body 102 instantly. Optionally, there may be further provided a cover 1530 for enclosing the female mating portion 1524 when the lawn mower 100 is operated without the cutter module 1500.

Figure 16:
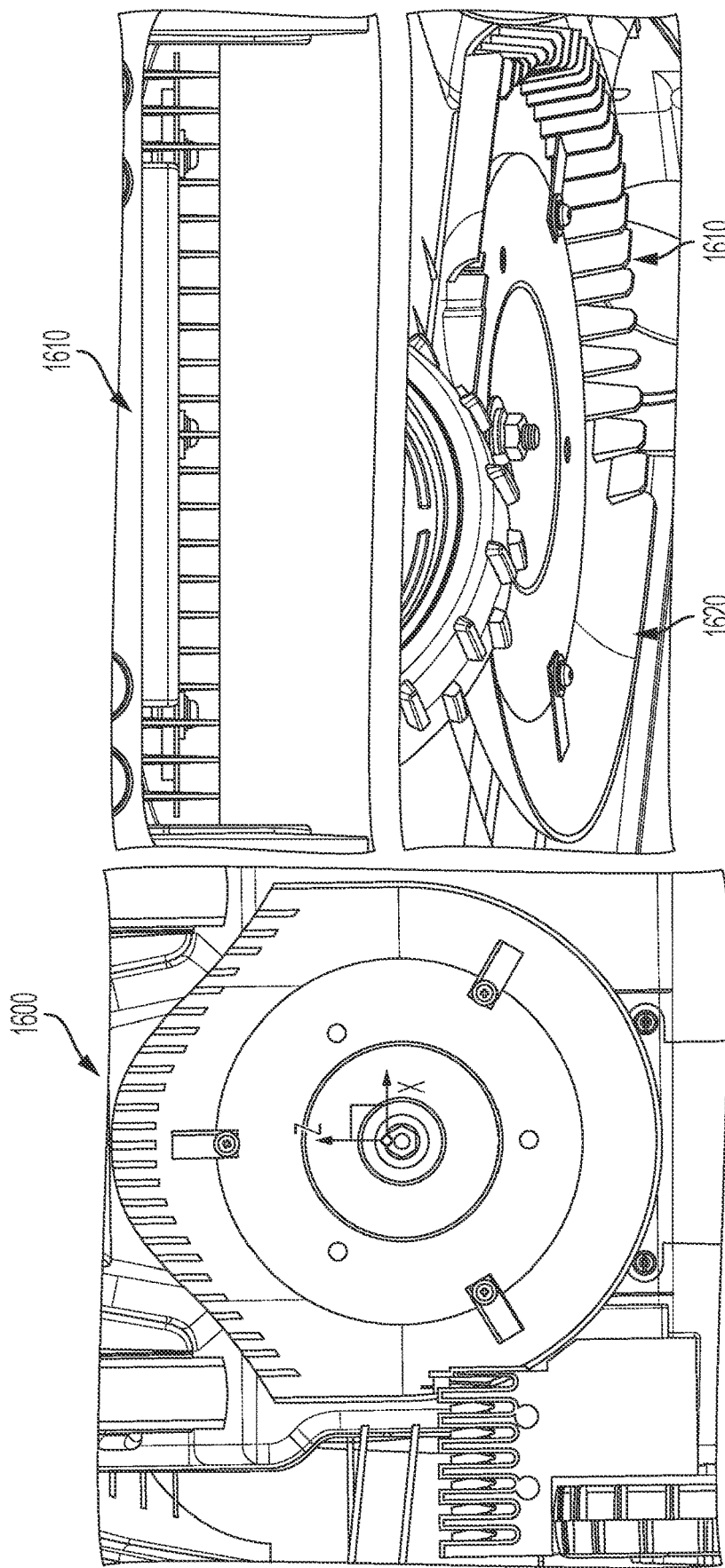
FIG. 16 are illustrations of an example implementation of a blade guard for the autonomous lawn mower of FIG. 1.

With reference to FIG. 16, there is provided an illustration of an autonomous lawn mower 100 comprising: a mower body 102 having at least one motor arranged to drive a cutting blade 212*b* and to propel the mower body 102 on an operating surface via a wheel arrangement, wherein the mower body 102 includes a navigation system 204 arranged to assist a controller 202 to control the operation of the mower body 102 within a predefined operating area; wherein at least part of the cutting blade 212*b* is surrounded by a blade guard 1600.

In this embodiment as shown in FIG. 16, the autonomous lawn mower 100 includes a blade guard 1600 for surrounding the cutting blade 212b. On the front edge of the blade guard 1600 which is substantially perpendicular to the operating direction of the autonomous lawn mower 100, there is provided a toothed comb 1610 between the two front wheels for combing the grass to be mowed before being trimmed by the cutting blade 212b. Advantageously, the toothed comb 1610 may minimise the undesirable interruption of the mowing operation by over-sized objects, thereby enhancing the efficiency of the cutting operation to a certain degree. Optionally, a plurality of protection ribs 1620 may also be provided on the side edges of the blade guard 1600 to prevent any undesirable objects from reaching the cutting blade 212b from the side directions.

With reference to FIGS. 17 to 20, there is provided an illustration of an autonomous lawn mower 100 comprising: a mower body 102 having at least one motor arranged to drive a cutting blade 212b and to propel the mower body 102 on an operating surface via a wheel arrangement, wherein the mower body 102 includes a navigation system 204 arranged to assist a controller 202 to control the operation of the mower body 102 within a predefined operating area; a battery module 1000 arranged to provide power supply to the motor; and a detachable docking module 900 arranged to provide battery charging to the battery module 1000.

Figure 17:
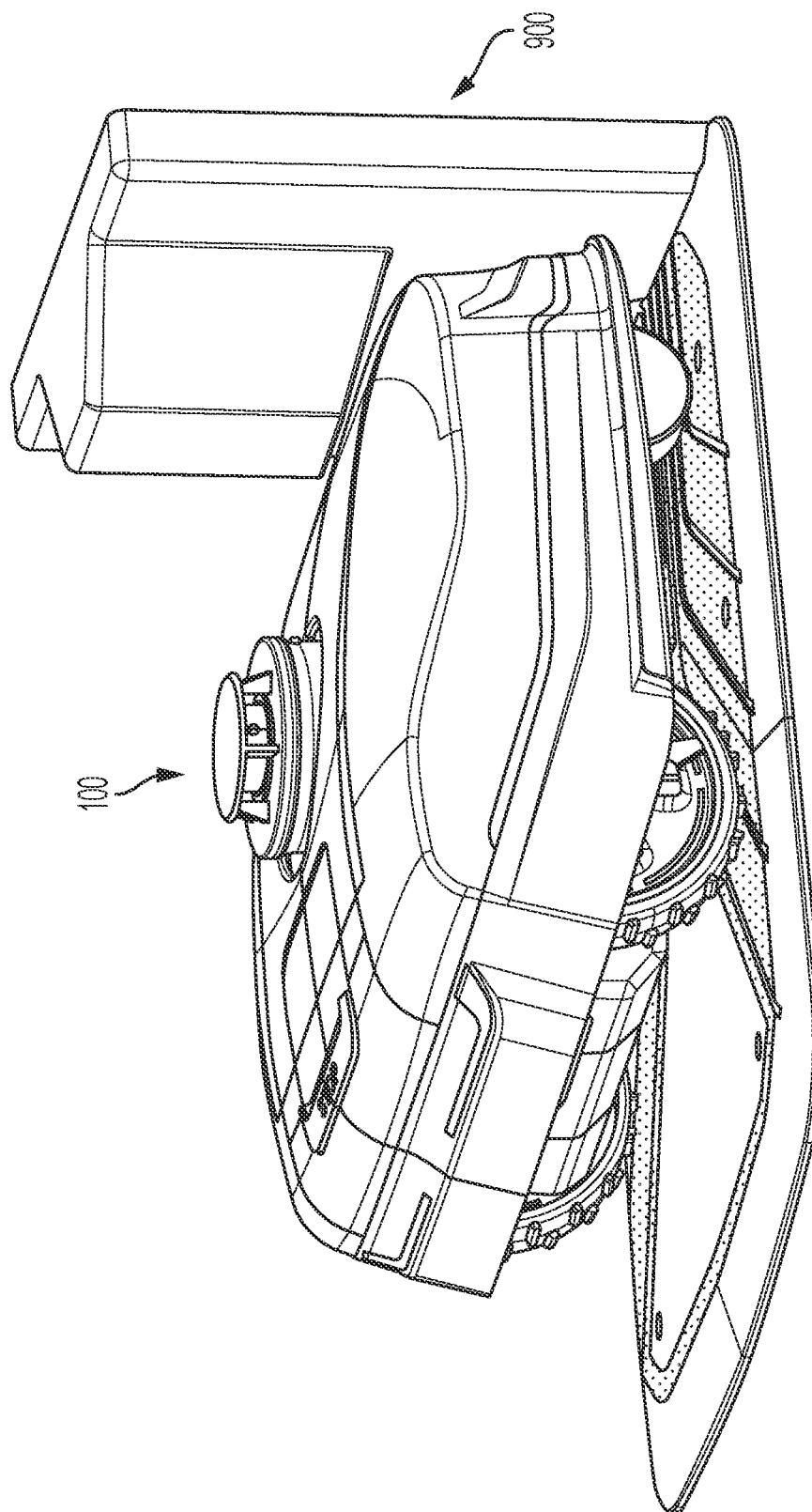
FIG. 17 is a perspective view of an example implementation of a docking module with the autonomous lawn mower of FIG. 1.

In this embodiment as shown in FIGS. 17 to 18, the autonomous lawn mower 100 includes a battery module 1000 for providing power supply to the motor, a detachable docking module 900 in electrical communication with a power plug for charging the battery module 1000, and a navigation system 204 for locating the mower 100 with reference to the position of the docking module 900. Advantageously, upon completing the mower operation or if the power level of the battery module 1000 is running low during mid of the operation, the navigation system 204 may direct or guide the mower 100 towards the docking module 900 through a "docking" process, such that the mower 100 may be switched off and/or the battery module 1000 may be recharged once the mower 100 is received by the docking module 900.

Figure 19:
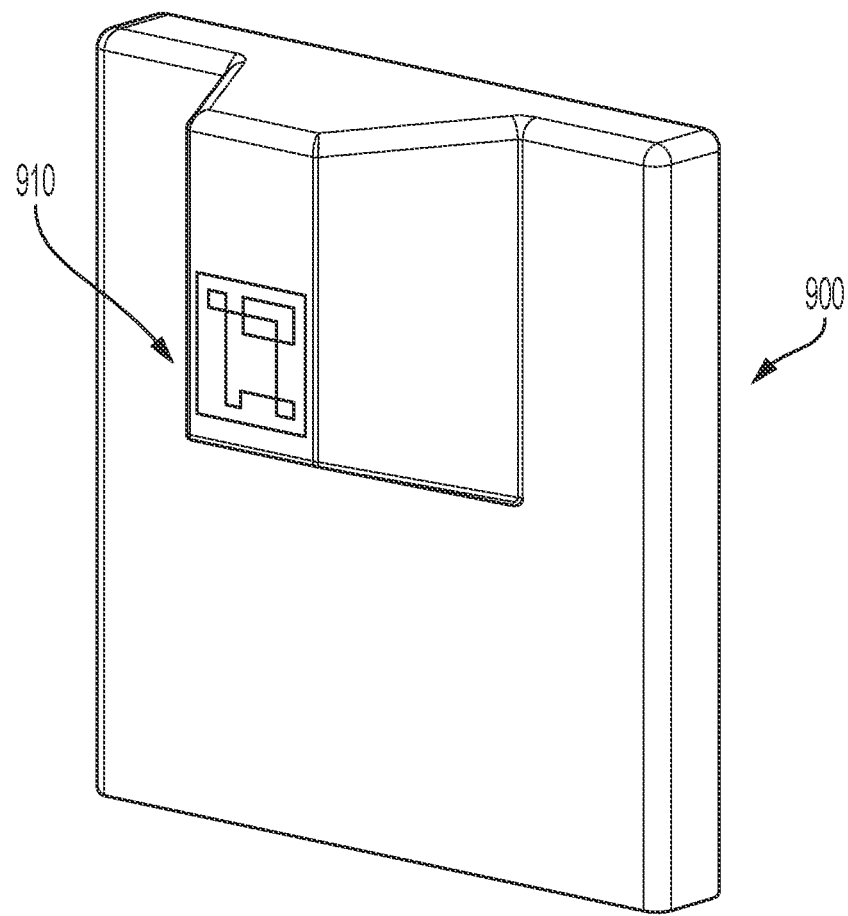
FIG. 19 is a perspective view of the docking module depicted in FIG. 17 with graphical indication.

Preferably, the navigation system 204 may include an imaging module 205, e.g. a web camera 205 for obtaining the information associated with the position of the docking module 900. On the other hand, the docking module 900 may provide the imaging module 205 an indication 910 representing the position of the docking module 900. Preferably, the indication 910 may be represented in a graphical representation at a visible area on the docking module 900 (as shown in FIG. 19), thereby allowing the imaging module 205 to capture the indication 910, and in turn calculate the present position of the mower 100 with respect to the docking module 900 through an image processing based on the rotation and distortion of the captured indication 910. Optionally, each indication 910 may provide a unique ID, such that one mower 100 may only map with one designated docking module 900.

Alternatively, the navigation system 204 may include an optical surveying module 222 for obtaining the information associated with the position of the docking module 900. For instance, the optical surveying module 222 may be the aforesaid single LIDAR unit 222L. Preferably, the LIDAR unit 222L may scan and survey the proximate area around the mower 100 to devise the surveyed representation of the predefined operation area. The optical surveying module 222 may then map the target LIDAR object with the sensed LIDAR object with the closest dimension to the docking module 900, thereby locating the position of the docking module 900, or determining the present position of the mower 100 with reference to the position of the docking module 900.

Figure 20:
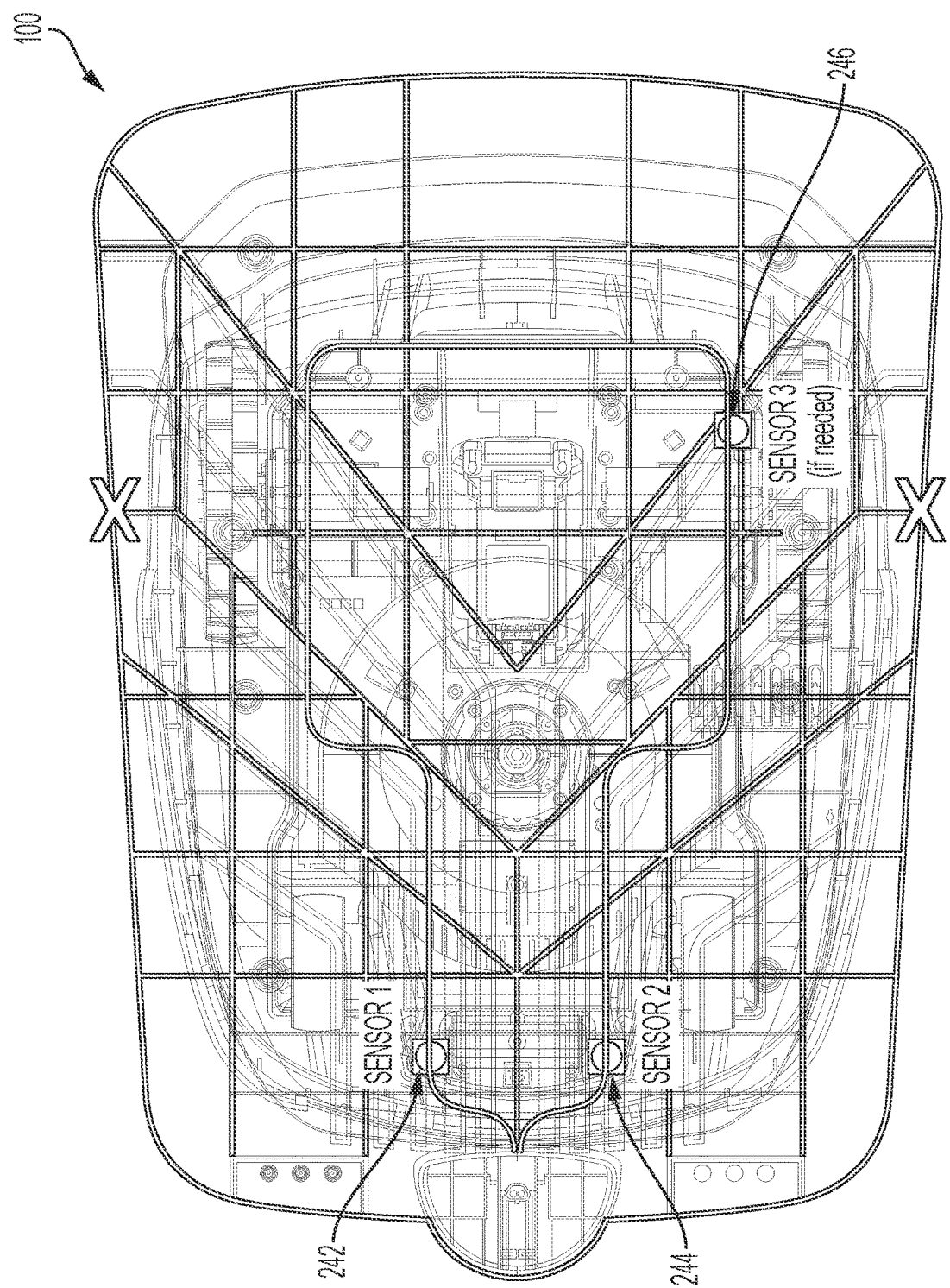
FIG. 20 is a top view of an example implementation of an induction wire system of the autonomous lawn mower.

In yet another embodiment as shown in FIG. 20, the navigation system 204 may include an induction wire system 240 for obtaining the information associated with the position of the detachable docking module 900. For instance, the induction wire system 240 may include a plurality of sensors 242, 244 and 246 positioned at any desirable positions within the mower 100. On the other hand, the docking module 900 may provide a core 248 (not shown) for communicating with the sensors 242, 244 and 246 in an electromagnetic communication. Preferably, the induction wire system 240 may calculate the present position of the mower 100 with respect to the docking module 900 based on the electromagnetic communication between the sensors 242, 244, 246 and the core 248 in a repetitive manner, thereby providing a docking assistance to the mower 100 during the docking process.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilised. This will include stand alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. An autonomous lawn mower comprising:
   a mower body having at least one motor arranged to drive a cutting blade and to propel the mower body on an operating surface via a wheel arrangement, wherein the mower body includes a navigation system arranged to assist a controller to control operation of the mower body within a predefined operating area, wherein:
   the navigation system includes a plurality of navigation modules, each arranged to obtain navigation information associated with navigation of the lawn mower, and
   the plurality of navigation modules includes an inertial measurement unit, and the inertial measurement unit is removable from the mower body for physical manipulation by a user, wherein the inertial measurement unit is configured to remain functional when the inertial measurement unit is removed from the mower body.

2. The autonomous lawn mower of claim 1, wherein the inertial measurement unit is connected to the lawn mower via a power cable when the inertial measurement unit is removed for the physical manipulation.

3. The autonomous lawn mower of claim 1, wherein the navigation information is further processed by the controller to control the operation of the lawn mower.

4. The autonomous lawn mower of claim 3, wherein the navigation information includes at least one of a distance and direction travelled by the wheel arrangement of the mower, a surveyed representation of the predefined operating area, a location of obstacles proximate to the lawn mower, and directions and accelerations of the lawn mower.

5. The autonomous lawn mower of claim 1, wherein the navigation system includes an odometry module arranged to track movement of the mower body on the operating surface;
wherein the odometry module is arranged to track the movement of the mower body on the operating surface by determining a rotation distance of at least one wheel of the wheel arrangement;
wherein the odometry module includes one or more sensors arranged to detect a rate of rotation of the at least one wheel of the wheel arrangement;
wherein the rate of rotation of the at least one wheel is applied to a transmission ratio to determine the rotation distance of the at least one wheel.

6. The autonomous lawn mower of claim 1, wherein the inertial measurement unit is configured to remain functional when the inertial measurement unit is removed from the mower body to allow the inertial measurement unit to be calibrated by the physical manipulation by the user when the inertial measurement unit is removed from the mower body.

7. The autonomous lawn mower of claim 1, wherein the inertial measurement unit is configured to be located in a compartment on an upward-facing surface of the mower body.

8. The autonomous lawn mower of claim 7, wherein the compartment and the inertial measurement unit are configured to be covered by an openable cover configured to protect the inertial measurement unit from external elements and configured to allow access to the inertial measurement unit.

9. The autonomous lawn mower of claim 8, wherein the openable cover is marked by a logo of a manufacturer of the autonomous lawn mower.

10. The autonomous lawn mower of claim 5, wherein the one or more sensors are disposed onto respective driving motors arranged to drive a pair of opposing wheels of the wheel arrangement;
wherein the odometry module is arranged to communicate with the one or more sensors disposed onto each driving motor to determine the rotation distance and a direction of rotation of each of the pair of opposing wheels; and
wherein the odometry module is arranged to transmit the rotation distance and the direction of rotation of each of the pair of opposing wheels to the navigation system.

11. The autonomous lawn mower of claim 1, wherein the navigation system includes an optical surveying module arranged to scan and survey the proximate area around the mower to devise a surveyed representation of the predefined operating area; and
wherein the optical surveying module is further arranged to use an optical means to scan and survey the proximate area around the mower.

12. The autonomous lawn mower of claim 11, wherein the optical surveying module is placed at an elevated position on the mower body; and
wherein the optical surveying module is a light detecting and ranging (LIDAR) unit.

13. The autonomous lawn mower of claim 1, wherein the navigation system further includes a sonic obstacle detection module arranged to use sound waves to detect-obstacles proximate to the mower; and
wherein the sonic obstacle detection module is a sonar unit.

14. The autonomous lawn mower of claim 1, wherein the inertial measurement unit is configured to measure and record physical forces subjected on the lawn mower.

15. The autonomous lawn mower of claim 1, wherein the inertial measurement unit includes its own energy storage device that is removable from the mower body along with the inertial measurement unit when the inertial measurement unit is removed from the mower body for the physical manipulation.

16. The autonomous lawn mower of claim 1, wherein the navigation system further includes at least one of a sensor arranged to provide the navigation information including GPS coordinates, a cliff sensor, a water sensor, a rain sensor, a light sensor, a communication module, and an edge sensor.

17. A system for navigating an autonomous lawn mower comprising:
a plurality of navigation modules within a mower body of the lawn mower, each navigation module arranged to obtain individual navigation information associated with navigation of the autonomous mower;
wherein the plurality of navigation modules operate during an initialisation mode to generate a virtual representation of an operation area of the lawn mower;
wherein during operation of the lawn mower, the virtual representation of the operation area is processed with the navigation information obtained by the plurality of navigation modules when the lawn mower is operating; and
wherein the plurality of navigation modules include an inertial measurement unit, and the inertial measurement unit is removable from the mower body for physical manipulation by a user, wherein the inertial measurement unit is configured to remain functional when the inertial measurement unit is removed from the mower body.

18. The system of claim 17, wherein the virtual representation of the operation area is compared with the navigation information obtained by the plurality of navigation modules when the lawn mower is operating to locate and navigate the lawn mower during operation.

19. The system of claim 17, wherein the plurality of navigation modules includes an odometry module arranged to track movement of the mower body of the lawn mower on an operating surface by determining a rotation distance of at least one wheel of a wheel arrangement of the lawn mower.

20. The system of claim 17, wherein the plurality of navigation modules includes an optical surveying module arranged to scan and survey the proximate area around the mower to devise a surveyed representation of the operation area.

21. The system of claim 17, wherein the plurality of navigation modules includes a sonic obstacle detection module arranged to use sound waves to detect obstacles proximate to the mower.

22. The system of claim 17, wherein the plurality of navigation modules includes the inertial measurement unit arranged to measure and record physical forces subjected on the lawn mower.

23. The system of claim 17, wherein the initialisation mode is performed by the user to define the operation area of the lawn mower.

24. The of claim 17, wherein the operation area of the lawn mower is defined by the user controlling the mower around a perimeter of the operation area.

25. The system of claim 17, wherein the inertial measurement unit is configured to remain functional when the inertial measurement unit is removed from the mower body to allow the inertial measurement unit to be calibrated by the physical manipulation by the user when the inertial measurement unit is removed from the mower body.

26. The system of claim 17, wherein the inertial measurement unit is configured to be located in a compartment on an upward-facing surface of the mower body; and wherein the compartment and the inertial measurement unit are configured to be covered by an openable cover configured to protect the inertial measurement unit from external elements and configured to allow access to the inertial measurement unit.

27. The system of claim 26, wherein the openable cover is marked by a logo of a manufacturer of the autonomous lawn mower.

28. The system of claim 17, wherein the inertial measurement unit includes its own energy storage device that is removable from the mower body along with the inertial measurement unit when the inertial measurement unit is removed from the mower body for the physical manipulation.

* * * * *